United States Patent
Wang et al.

(10) Patent No.: US 12,322,092 B2
(45) Date of Patent: Jun. 3, 2025

(54) MEDICAL IMAGE PROCESSING METHOD AND APPARATUS, IMAGE PROCESSING METHOD AND APPARATUS, TERMINAL AND STORAGE MEDIUM

(71) Applicant: TENCENT TECHNOLOGY (SHENZHEN) COMPANY LIMITED, Guangdong (CN)

(72) Inventors: Liang Wang, Shenzhen (CN); Hanbo Chen, Shenzhen (CN); Jiarui Sun, Shenzhen (CN); Yanchun Zhu, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 647 days.

(21) Appl. No.: 17/685,847

(22) Filed: Mar. 3, 2022

(65) Prior Publication Data
US 2022/0189017 A1    Jun. 16, 2022

Related U.S. Application Data

(63) Continuation of application No. PCT/CN2020/126063, filed on Nov. 3, 2020.

(30) Foreign Application Priority Data

Feb. 10, 2020   (CN) .......................... 202010084678.8

(51) Int. Cl.
*G06T 7/00*   (2017.01)
*G06T 5/20*   (2006.01)
*G06T 7/194*   (2017.01)

(52) U.S. Cl.
CPC .............. *G06T 7/0012* (2013.01); *G06T 5/20* (2013.01); *G06T 7/194* (2017.01);
(Continued)

(58) Field of Classification Search
CPC .......... G06T 7/0012; G06T 7/194; G06T 5/20
See application file for complete search history.

(56) References Cited

U.S. PATENT DOCUMENTS 10,482,579 B2 * 11/2019 Mori .......................... G06T 5/10
12,125,264 B1 * 10/2024 Park ....................... G06T 7/0004
(Continued)

FOREIGN PATENT DOCUMENTS

CN        103903254 A     7/2014
CN        104036490 A     9/2014
(Continued)

OTHER PUBLICATIONS

Extended European Search Report dated Nov. 23, 2022 in Application No. 20919308.5.
(Continued)

*Primary Examiner* — Kevin Ky
(74) *Attorney, Agent, or Firm* — Sughrue Mion, PLLC

(57) ABSTRACT

A medical image processing method and apparatus, and an image processing method and apparatus, terminal and storage medium that obtains a to-be-processed medical image; generates a difference image according to the first image data, the second image data, and the third image data included in the to-be-processed medical image; and performs binarization processing on the difference image to obtain a binarized image, a foreground region of the binarized image corresponding to a pathological tissue region of the to-be-processed medical image. A difference image is generated based on color information of different channels before binarization processing is performed on an image,
(Continued)

thereby effectively using the color information in the image. The pathological tissue region extracted based on the difference image is more accurate and facilitates subsequent image analysis.

18 Claims, 9 Drawing Sheets

(52) U.S. Cl.
CPC .............. *G06T 2207/10024* (2013.01); *G06T 2207/20032* (2013.01); *G06T 2207/20081* (2013.01); *G06T 2207/30024* (2013.01)

(56) References Cited

U.S. PATENT DOCUMENTS

| | | | | |
|---|---|---|---|---|
| 2014/0177953 | A1* | 6/2014 | Shevchenko | H04N 1/32309 382/164 |
| 2016/0198107 | A1* | 7/2016 | Yamazaki | H04N 23/673 348/350 |
| 2016/0310095 | A1* | 10/2016 | Kimoto | A61B 6/5217 |
| 2016/0378117 | A1* | 12/2016 | Szatmary | G06V 10/145 382/153 |
| 2017/0154222 | A1* | 6/2017 | Zakaluk | G06T 7/277 |
| 2018/0096742 | A1* | 4/2018 | Donovan | G16H 50/30 |
| 2019/0311479 | A1* | 10/2019 | Yun | G06T 7/0014 |
| 2020/0013148 | A1* | 1/2020 | Jones | G06T 5/73 |
| 2020/0234419 | A1* | 7/2020 | Ota | B22C 19/04 |
| 2020/0273157 | A1* | 8/2020 | Shao | G06T 1/0028 |
| 2022/0189017 | A1* | 6/2022 | Wang | G06T 7/11 |

FOREIGN PATENT DOCUMENTS

| | | |
|---|---|---|
| CN | 106295645 A | 1/2017 |
| CN | 106469267 A | 3/2017 |
| CN | 109461143 A | 3/2019 |
| CN | 110575178 A | 12/2019 |
| CN | 110705425 A | 1/2020 |
| CN | 111275696 A | 6/2020 |
| EP | 1 081 648 A2 | 3/2001 |
| JP | 8-279046 A | 10/1996 |
| JP | 2001-101426 A | 4/2001 |
| JP | 2011-48627 A | 3/2011 |
| JP | 2013-238459 A | 11/2013 |
| JP | 2018-152095 A | 9/2018 |
| WO | 2018/180386 A1 | 10/2018 |

OTHER PUBLICATIONS

Japanese Office Action dated Jun. 12, 2023 in Japanese Application No. 2022-524010.
Corrected Version of the Written Opinion dated Dec. 11, 2020 issued by the International Searching Authority in Application No. PCT/CN2020/126063.
International Search Report for PCT/CN2020/126063 dated Dec. 8, 2020 (PCT/ISA/210).
Written Opinion for PCT/CN2020/126063 dated Dec. 8, 2020 (PCT/ISA/237).

* cited by examiner (A)            (B)

(A)            (B)

(A)            (B)

MEDICAL IMAGE PROCESSING METHOD AND APPARATUS, IMAGE PROCESSING METHOD AND APPARATUS, TERMINAL AND STORAGE MEDIUM

CROSS-REFERENCE TO RELATED APPLICATION(S)

This application is a continuation application of International Application No. PCT/CN2020/126063, filed Nov. 3, 2020, which claims priority to Chinese Patent Application No. 202010084678.8, filed with the China National Intellectual Property Administration on Feb. 10, 2020, the disclosures of which are incorporated by reference in their entireties.

FIELD

The present disclosure relates to the artificial intelligence field, and specifically, to image processing technologies.

BACKGROUND

With the development of medical technologies, recognition and analysis based on whole slide images (WSI) play an important role in medical treatment. Since the length of a side of a WSI image is usually tens of thousands of pixels, it is necessary to scale down or cut this type of image into a small image for analysis. In this process, most of a background region of the WSI image needs to be removed to obtain a region with a pathological tissue slide for subsequent image analysis.

Currently, the pathological tissue region is extracted from the WSI image mainly in the following manner: first scaling down the WSI image to a particular size and then converting the image that is scaled down to a gray-scale image, then performing further image processing on the gray-scale image, for example, image binarization processing and hole removal processing, and finally extracting a pathological tissue region from the processed image.

However, in the foregoing manner, directly converting the color image into the gray-scale image after the size is changed causes loss of color information, and the color information is also an important image feature. As a result, the extracted pathological tissue region is not sufficiently accurate, which easily causes errors in subsequent image analysis.

SUMMARY

The present disclosure provides a medical image processing method and apparatus, and an image processing method and apparatus, a terminal and a storage medium, to generate a difference image based on color information of different channels before binarization processing is performed on an image, thereby effectively using the color information in the image. The pathological tissue region extracted based on the difference image is more accurate and facilitates subsequent image analysis.

In view of this, a first aspect of the disclosure may provide a medical image processing method, executed by a server, including:

obtaining a to-be-processed medical image, the to-be-processed medical image being a color image, the to-be-processed medical image including first image data, second image data, and third image data, and the first image data, the second image data, and the third image data respectively corresponding to color information of different attributes;

generating a difference image according to the first image data, the second image data, and the third image data; and performing binarization processing on the difference image, to obtain a binarized image, a foreground region of the binarized image corresponding to a pathological tissue region of the to-be-processed medical image.

A second aspect of the disclosure may provide an image processing method, executed by a server, including:

obtaining a first to-be-processed image and a second to-be-processed image, the first to-be-processed image being a color image, the first to-be-processed image including first image data, second image data, and third image data, and the first image data, the second image data, and the third image data respectively corresponding to color information of different channels;

generating a difference image according to the first image data, the second image data, and the third image data;

performing binarization processing on the difference image, to obtain a binarized image, a foreground region of the binarized image corresponding to a pathological tissue region of the to-be-processed medical image; extracting the pathological tissue region from the first to-be-processed image according to the foreground region of the binarized image; and generating a synthesized image according to the pathological tissue region and the second to-be-processed image, where the pathological tissue region is on a first image layer, the second to-be-processed image is on a second image layer, and the first image layer covers the second image layer.

A third aspect of the disclosure may provide a medical image processing apparatus, including:

an obtaining module, configured to obtain a to-be-processed medical image, the to-be-processed medical image being a color image, the to-be-processed medical image including first image data, second image data, and third image data, and the first image data, the second image data, and the third image data respectively corresponding to color information of different channels;

a generation module, configured to generate a difference image according to the first image data, the second image data, and the third image data; and a processing module, configured to perform binarization processing on the difference image, to obtain a binarized image, a foreground region of the binarized image corresponding to a pathological tissue region of the to-be-processed medical image. In a possible design, in an implementation of the third aspect of the embodiments of the disclosure, the generation module is further configured to generate a maximum value image and a minimum value image according to the first image data, the second image data, and the third image data included in the to-be-processed medical image; and generate the difference image according to the maximum value image and the minimum value image.

In another example of the third aspect of the embodiments of the disclosure, the generation module may be further configured to determine the maximum pixel value and the minimum pixel value according to a first pixel value of a first pixel location of the first image data, a second pixel value of a second pixel location of the second image data, and a third pixel value of a third pixel location of the third image data; and obtain a maximum value image according to the maximum pixel value, and obtain a minimum value image according to the minimum pixel value, where a pixel value of a fourth pixel location of the maximum value image is the maximum pixel value, a pixel value of a fifth pixel location of the minimum value image is the minimum pixel value, and the first pixel location, the second pixel location, the third pixel location, the fourth pixel location, and the fifth pixel location all correspond to the same pixel location of the to-be-processed medical image; and the generation module is further configured to determine a pixel difference according to the pixel value of the fourth pixel location of the maximum value image and the pixel value of the fifth pixel location of the minimum value image; and obtain the difference image according to the pixel difference, where a pixel value of a sixth pixel location of the difference image is the pixel difference, and the fourth pixel location, the fifth pixel location, and the sixth pixel location all correspond to the same pixel location of the to-be-processed medical image.

In an example of the third aspect of the embodiments of the disclosure, the generation module may be further configured to generate a to-be-processed difference image according to the first image data, the second image data, and the third image data; and perform Gaussian blur processing on the to-be-processed difference image, to obtain the difference image.

In an example of the third aspect of the embodiments of the disclosure, the medical image processing apparatus may further include a determining module;

the determining module is configured to determine a binarization threshold according to the difference image; and the determining module is further configured to perform binarization processing on the difference image according to the binarization threshold, to obtain the binarized image.

In an example of the third aspect of the embodiments of the disclosure, the determining module is further configured to obtain, according to the difference image, N pixel values corresponding to N pixels, where the pixel value and the pixel are in a one-to-one correspondence, and N is an integer greater than 1;

determine a reference pixel value in the N pixel values, where the reference pixel value is a maximum value of the N pixel values; and determine the binarization threshold according to the reference pixel value and a preset proportion.

In an example of the third aspect of the embodiments of the disclosure, the generation module may be further configured to detect a background region in the binarized image based on a flood algorithm, where the background region includes a plurality of background pixels;

obtain background pixels in a foreground region in the binarized image according to the binarized image and the background region in the binarized image, where the foreground region includes a plurality of foreground pixels;

change the background pixels in the foreground region in the binarized image to foreground pixels, to obtain a hole filling image; and perform median filtering processing on the hole filling image, to obtain a result image, where a foreground region of the result image corresponds to the pathological tissue region of the to-be-processed medical image.

In an example of the third aspect of the embodiments of the disclosure, the processing module may be further configured to perform median filtering processing on the hole filling image, to obtain a filtered image;

obtain a boundary line of a foreground region in the filtered image, where the boundary line includes M pixels, and M is an integer greater than 1; and extend each of the M pixels of the boundary line outwards by K pixels, to obtain the result image, where K is an integer greater than or equal to 1.

In an example of the third aspect of the embodiments of the disclosure, the obtaining module may be further configured to obtain an original medical image;

extract a medical sub-image from the original medical image based on the sliding window;

determine, based on the medical sub-image comprising the pathological tissue region, the medical sub-image as the to-be-processed medical image; and determine, based on the medical sub-image not comprising the pathological tissue region, the medical sub-image as a background image and remove the background image.

In an example of the third aspect of the embodiments of the disclosure, the image processing apparatus may further include a training module;

the generation module is further configured to generate a target positive sample image according to the to-be-processed image and the foreground region of the to-be-processed image, where the target positive sample image is a positive sample image in a positive sample set, and each positive sample image includes the pathological tissue region;

the obtaining module is further configured to obtain a negative sample set, where the negative sample set includes at least one negative sample image, and each negative sample image does not include the pathological tissue region; and the training module is configured to train an image processing model based on the positive sample set and the negative sample set.

A fourth aspect of the disclosure may provide an image processing apparatus, including:

an obtaining module, configured to obtain a first to-be-processed image and a second to-be-processed image, the first to-be-processed image being a color image, the first to-be-processed image including first image data, second image data, and third image data, and the first image data, the second image data, and the third image data respectively corresponding to color information of different channels;

a generation module, configured to generate a difference image according to the first image data, the second image data, and the third image data; and a processing module, configured to perform binarization processing on the difference image, to obtain a binarized image, a foreground region of the binarized image corresponding to a target object of the to-be-processed medical image; and an extraction module, configured to extract a target object from the first to-be-processed image according to the foreground region of the binarized image; and the generation module is further configured to generate a synthesized image according to the target object and the second to-be-processed image, the target object being on a first image layer, the second to-be-processed image being on a second image layer, and the first image layer covering the second image layer.

A fifth aspect the disclosure may provide a computer-readable storage medium, storing instructions, where the instructions, when executed on a computer, causing the computer to execute the methods according to the foregoing aspects.

It can be seen from the above technical solutions that the embodiments of the disclosure have the following advantages:

The embodiments of the disclosure provide the medical image processing method. The to-be-processed medical color image may be first obtained, where the to-be-processed medical image includes the first image data, the second image data, and the third image data, and the first image data, the second image data, and the third image data respectively correspond to color information of different attributes. Then, the difference image is generated according to the first image data, the second image data, and the third image data. Further, binarization processing is performed on the difference image, to obtain the binarized image, where the foreground region of the binarized image corresponds to the pathological tissue region of the to-be-processed medical image. In the foregoing manner, color information of a gray-scale pixel in different channels is slightly different, and color information of a color pixel in different channels is greatly different. Therefore, a difference image is generated based on color information of different channels before binarization processing is performed on an image, thereby effectively using the color information in the image. The pathological tissue region extracted based on the difference image is more accurate and facilitates subsequent image analysis.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
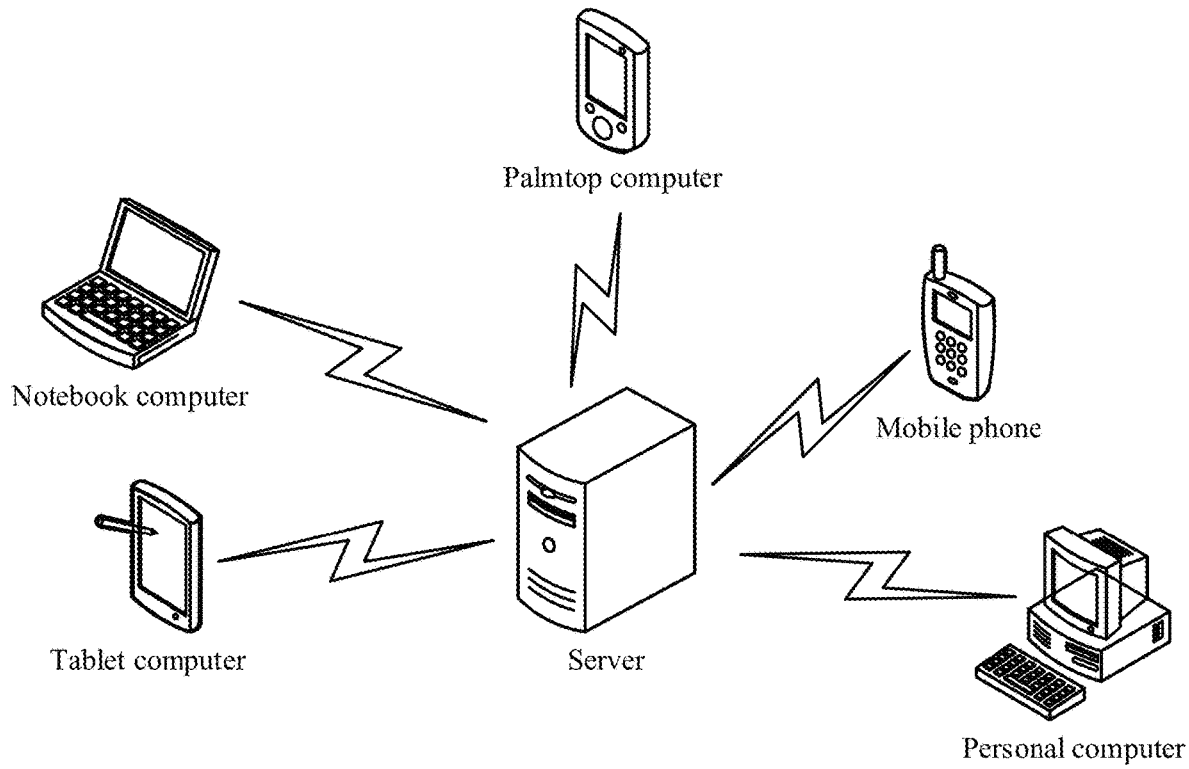
FIG. 1 is a schematic architectural diagram of a medical image processing system according to an embodiment of the disclosure.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

The embodiments of the disclosure provide a medical image processing method and apparatus, and an image processing method and apparatus, to generate a difference image based on color information of different channels before binarization processing is performed on an image, thereby effectively using the color information in the image. The pathological tissue region extracted based on the difference image is more accurate and facilitates subsequent image analysis.

In the specification, claims, and accompanying drawings of the disclosure, the terms "first", "second", "third", "fourth", and so on (if existing) are intended to distinguish between similar objects rather than describe a specific order or sequence. Data used in this way may be interchanged in an appropriate case, so that the embodiments of the disclosure described herein can be implemented in a sequence other than the sequence illustrated or described herein. In addition, the terms "include", "corresponding to" and any other variants are intended to cover the non-exclusive inclusion. For example, a process, method, system, product, or device that includes a series of steps or operations, or code or units is not necessarily limited to those expressly listed steps or units, but may include other steps or operations, or code or units not expressly listed or inherent to such a process, method, product, or device.

The embodiments of the disclosure may be applied to a scenario of image processing. An image, as the visual basis for humans to perceive the world, is an important means for humans to obtain information, express information, and transfer information. Image processing is a technology that may be used to analyze an image to obtain a required result. Image processing generally refers to processing of a digital image, and the digital image is a large two-dimensional array shot by an industrial camera, a video camera, or a scanner device. An element of the array is referred to as a pixel, and a value of a pixel is referred to as a gray-scale value. An image processing technology may help people to understand the world more objectively and accurately. The visual system of humans may help humans obtain a large amount of information from the outside world. Images and graphs are carriers of all visual information. Although human eyes are highly capable of distinguishing and can identify thousands of colors, images are blurred or even invisible to human eyes in many cases. Therefore, the image processing technology may make blurred or even invisible images clear. Specifically, image processing technologies may include, but are not limited to, image transformation, image encoding compression, image enhancement and restoration, image segmentation, image description, the image matting technology, and image classification.

The image processing method provided in the disclosure may be applied to a scenario of the medical field. A medical image that may be processed includes, but is not limited to, a brain image, a heart image, a chest image, and a cell image. A medical image may be affected by noise, the field offset effect, the partial volume effect, and tissue movement. Because individual creatures are different and have complex organizational structural shapes, a medical image is usually more blurred and uneven than an ordinary image. The medical image in the disclosure is a color image, which may be a color ultrasonic image or a whole slide image (WSI), and may also include a color digital image obtained from a microscope. A WSI image is used as an example, and the length of a side of a WSI image is usually between 10000 pixels and 100000 pixels. A WSI image usually needs to be scaled down or cut into a small image for further processing. In a process of processing the image, a region with a pathological tissue slide needs to be obtained, and then pathological analysis is performed according to the region, for example, nucleus quantitative analysis, cytomembrane quantitative analysis, cytoplasm quantitative analysis, and tissue microvascular analysis. Therefore, based on the feature of a medical image, in the medical image processing method in the disclosure, the to-be-processed medical image may be obtained. The difference image may be generated based on the first image data, the second image data, and the third image data included in the to-be-processed medical image, where the first image data, the second image data, and the third image data respectively correspond to color information of different attributes. Further, binarization processing is performed on the difference image, to obtain the binarized image, where the foreground region of the binarized image corresponds to the pathological tissue region of the to-be-processed medical image. Color information of a gray-scale pixel in different channels is slightly different, and color information of a color pixel in different channels is greatly different. Therefore, a difference image is generated based on color information of different channels before binarization processing is performed on an image, thereby effectively using the color information in the image. The pathological tissue region extracted based on the difference image is more accurate and facilitates subsequent image analysis.

In another example, image processing may be further applied to a scenario of the remote sensing field. Due to rapid development of the information technology and space technology, and continuous improvement of satellite space resolutions, high-resolution remote sensing images may be applied to ocean monitoring, land coverage monitoring, marine pollution, and maritime rescue. High-resolution remote sensing images are characterized by abundant image detail information, obvious geometrical structures of surface features, and complex target structures. For example, in a high-resolution remote sensing image, shadows of objects on the coastline are complex, the vegetation coverage area is large, or artificial facility brightness processing is not sufficiently clear. Given that a high-resolution remote sensing image usually has more details and is more complex than an ordinary image, when the vegetation coverage area in the high-resolution remote sensing image needs to be determined, vegetation may be removed from the high-resolution remote sensing image to determine the corresponding area. Therefore, based on the feature of a high-resolution remote sensing image, in the image processing method in the disclosure, the difference image may be generated based on the first image data, the second image data, and the third image data included in the first to-be-processed image, where the first to-be-processed image is a color image, and the first image data, the second image data, and the third image data included in the first to-be-processed image respectively correspond to color information of different channels. Further, binarization processing is performed on the generated difference image, to obtain the binarized image, where the foreground region of the binarized image corresponds to the pathological tissue region of the to-be-processed medical image. Then, a target object (for example, a vegetation region) is extracted from the first to-be-processed image according to a result image. The difference image is generated based on color information of different channels before binarization processing is performed on the image. Because color information of a gray-scale pixel in different channels is slightly different, and color information of a color pixel in different channels is greatly different, color information of the image may be effectively used. The target object extracted based on the difference image is more accurate, and details of the high-resolution remote sensing image may be more precisely obtained, thereby improving processing accuracy of the high-resolution remote sensing image.

For example, the embodiments of the disclosure are applied to a scenario of the medical field, to improve accuracy of an extracted pathological tissue region and facilitate subsequent image analysis in a scenario of the medical field. The present disclosure proposes a medical image processing method. The method is applied to a medical image processing system shown in FIG. 1. FIG. 1 is a schematic architectural diagram of a medical image processing system according to an embodiment of the disclosure. As shown in FIG. 1, the image processing system includes a server and a terminal device. The medical image processing apparatus may be deployed on a server, and may also be deployed on a terminal device with a high computing capability.

For example, the medical image processing apparatus is deployed on a server. The server obtains a to-be-processed medical image, then generates a difference image according to first image data, second image data, and third image data included in the to-be-processed medical image, and further performs binarization processing on the difference image, to obtain a binarized image, where a foreground region of the binarized image corresponds to a pathological tissue region of the to-be-processed medical image. The server may analyze the medical image based on the pathological tissue region.

For example, the medical image processing apparatus is deployed on a terminal device. The terminal device obtains a to-be-processed medical image, then generates a difference image according to first image data, second image data, and third image data included in the to-be-processed medical image, and further performs binarization processing on the difference image, to obtain a binarized image, where a foreground region of the binarized image corresponds to a pathological tissue region of the to-be-processed medical image. The terminal device may analyze the medical image based on the pathological tissue region.

The server in FIG. 1 may be one server, or a server cluster including a plurality of servers, or a cloud computing center, which is not specifically limited herein. The terminal device may be a tablet computer, a notebook computer, a palmtop computer, a mobile phone, a personal computer (PC), or a voice interaction device shown in FIG. 1, and may also be a monitoring device, a face recognition device, or the like, which is not limited herein.

Although FIG. 1 only shows five terminal devices and one server, it is to be understood that the example in FIG. 1 is only used for understanding this solution, and a specific quantity of the terminal devices and the servers is to be determined with reference to actual situations flexibly.

The embodiments of the disclosure are applicable to the AI field. Therefore, before the model training method provided in the embodiments of the disclosure is described, some basic concepts of the AI field are introduced first. AI is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making. The AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include a computer vision technology, a speech processing technology, a natural language processing (NLP) technology, machine learning (ML)/deep learning, and the like. ML is an interdisciplinarity involving a plurality of disciplines such as the probability theory, statistics, approximation theory, convex analysis, algorithm complexity theory, and the like. ML specializes in studying how a computer simulates or implements a human learning behavior to obtain new knowledge or skills, and reorganize an existing knowledge structure, so as to keep improving its performance. Machine learning is the core of artificial intelligence, and the fundamental way to make a computer intelligent, and machine learning applications cover all fields of artificial intelligence. The ML and deep learning generally include technologies such as an artificial neural network, a belief network, reinforcement learning, transfer learning, inductive learning, and learning from demonstrations.

With the research and progress of the AI technology, the AI technology is studied in many directions. The computer vision (CV) is a science that studies how to use a machine to "see" in many research directions of the AI technology, and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific subject, the CV studies related theories and technologies and attempts to establish an AI system that can obtain information from images or multi-dimensional data. The CV technologies generally include technologies such as image processing, image recognition, image semantic understanding (ISU), image retrieval, optical character recognition (OCR), video processing, video semantic understanding, video content/behavior recognition, 3D object reconstruction, a 3D technology, virtual reality, augmented reality, synchronous positioning, and map construction, and further include biological feature recognition technologies such as common face recognition and fingerprint recognition.

Figure 2:
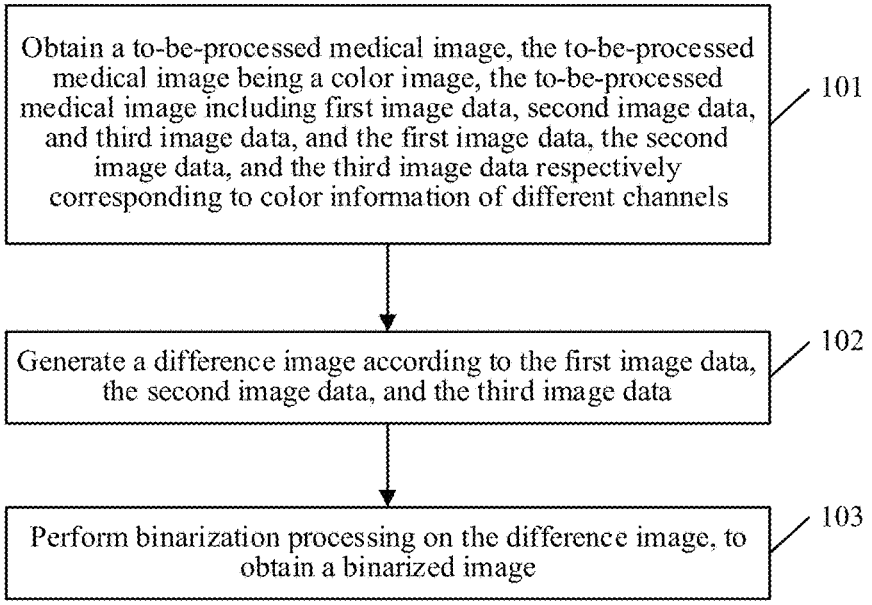
FIG. 2 is a schematic diagram of an embodiment of a medical image processing method according to an embodiment of the disclosure.

The solution provided in the embodiments of the disclosure relates to an image processing technology of AI, and the medical image processing method according to the disclosure is described below with reference to the foregoing descriptions. Referring to FIG. 2, a schematic diagram of an embodiment of a medical image processing method according to an embodiment of the disclosure, including:

101: Obtain a to-be-processed medical image, the to-be-processed medical image being a color image, the to-be-processed medical image including first image data, second image data, and third image data, and the first image data, the second image data, and the third image data respectively corresponding to color information of different channels.

In this embodiment, the medical image processing apparatus may obtain a to-be-processed medical image that is a color image, where the to-be-processed medical image may include first image data, second image data, and third image data, and the first image data, the second image data, and the third image data respectively correspond to color information of different channels. The to-be-processed medical image may be a medical image received by the medical image processing apparatus through a wired network, or may be a medical image stored by the medical image processing apparatus.

The to-be-processed medical image may be a region clipped from a WSI image. The WSI image may be obtained by scanning a finished slide through a microscope. Because a finished slide is a glass slide produced after performing hematoxylin staining or other staining methods, a WSI image obtained after scanning a finished slide through a microscope is a color image. Image color modes of a color image include, but are not limited to, a red green blue (RGB) color mode, a luminance bandwidth chrominance (YUV) color mode, and a hue-saturation-value (HSV) color mode. Color information may be expressed as pixel values in different channels, for example, a pixel value of an R channel, a pixel value of a G channel, and a pixel value of a B channel.

Formats of a WSI image include, but are not limited to, file formats such as SVS and NDPI, while the length and the width of a WSI image usually fall within tens of thousands of pixels and the image is large. Directly processing a WSI image requires a large memory. Therefore, a WSI image needs to be cut off. A WSI image may be usually read through an openslide tool of python, and the openslide tool may implement file format conversion and may further store, as an image with a resolution of 12*12, a region clipped from a WSI image. In an actual case, resolutions include, but are not limited to, 15*15 and 50*50. A plurality of images are stored in the same WSI image file. In actual application, an image with the maximum resolution is read from the WSI image file as a to-be-processed image. Besides, in this embodiment, the to-be-processed medical image may be clipped from the WSI image that is scaled down, and the WSI image may be scaled down by any multiple, for example, 20 times or 10 times. The length and the width of the WSI image that is scaled down fall within several thousands of pixels. Because a multiple for scaling down is artificially defined, a specific multiple for scaling down should be flexibly determined with reference to an actual case.

Figure 3:
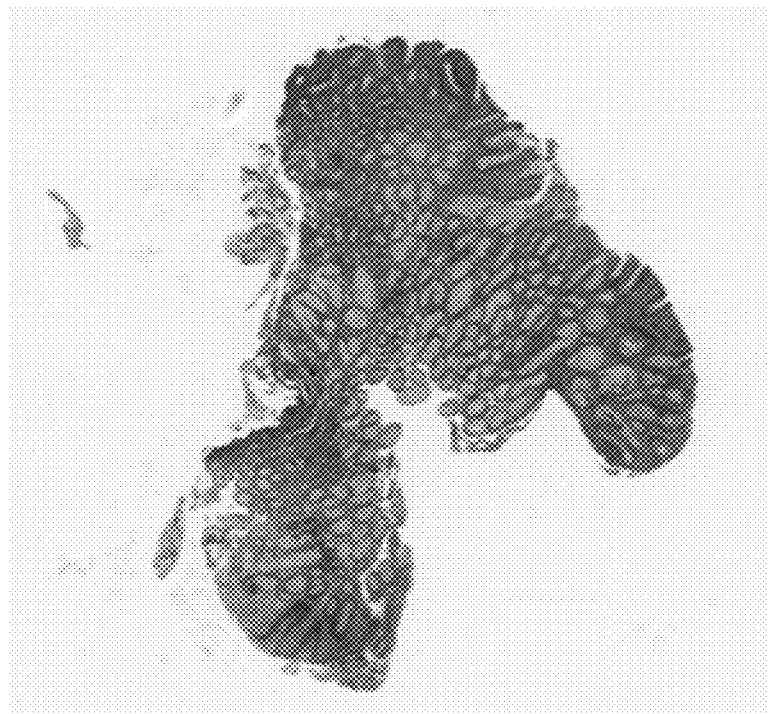
FIG. 3 is a schematic diagram of a to-be-processed medical image according to an embodiment of the disclosure.

For ease of understanding, refer to FIG. 3. FIG. 3 is a schematic diagram of an embodiment of a to-be-processed medical image according to an embodiment of the disclosure. As shown in FIG. 3, the to-be-processed medical image includes a pathological tissue region, and no other gray-scale background or pure-white background interferes with the to-be-processed medical image. To further understand this embodiment, for example, an image color mode of the to-be-processed medical image is RGB. Since the first image data, the second image data, and the third image data included in the to-be-processed medical image respectively correspond to color information in different channels, if RGB corresponding to the color image is (200, 100, 60), the first image data may have a pixel value 200 corresponding to an R channel, the second image data may have a pixel value 100 corresponding to a G channel, and the third image data may have a pixel value 60 corresponding to a B channel. If RGB corresponding to the color image is (100, 80, 40), the first image data may have a pixel value 100 corresponding to the R channel, the second image data may have a pixel value 80 corresponding to the G channel, and the third image data may have a pixel value 40 corresponding to the B channel.

An HSV image or a YUV image may be first converted into an RGB image, and then subsequent processing is performed.

In actual application, color information specifically corresponding to the first image data, the second image data, and the third image data should be flexibly determined with reference to an actual case. The medical image processing apparatus may be deployed on a server, and may also be deployed on a terminal device with a high computing capability. In this embodiment, for example, the medical image processing apparatus is deployed on a server.

102: Generate a difference image according to the first image data, the second image data, and the third image data included in the to-be-processed medical image.

Figure 4:
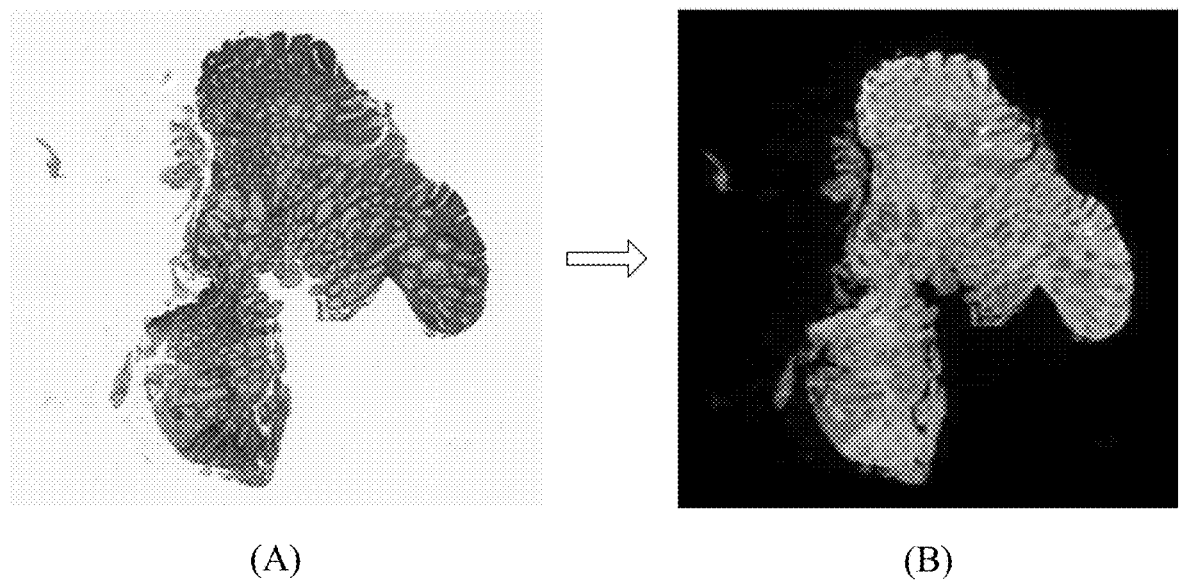
FIG. 4 is a schematic diagram of a difference image according to an embodiment of the disclosure.

In this embodiment, the medical image processing apparatus may generate the difference image according to the first image data, the second image data, and the third image data. Specifically, the difference image is represented as a gray-scale image. For ease of understanding, refer to FIG. 4. FIG. 4 is a schematic diagram of an embodiment of a difference image according to an embodiment of the disclosure. As shown in FIG. 4, a difference image shown in (B) in FIG. 4 may be generated according to first image data, second image data, and third image data included in a to-be-processed medical image in (A) in FIG. 4. The difference image may be an image that includes a pathological tissue region shown in FIG. 4. Because color information corresponding to different channels is used to distinguish pixel values, for example, the image color mode of the to-be-processed medical image is RGB. If the to-be-processed medical image is gray, RGB are similar. If the to-be-processed medical image is in color, RGB are greatly different, and a region with a pathological tissue has a large chromatic aberration.

103: Perform binarization processing on the difference image to obtain a binarized image.

Figure 5:
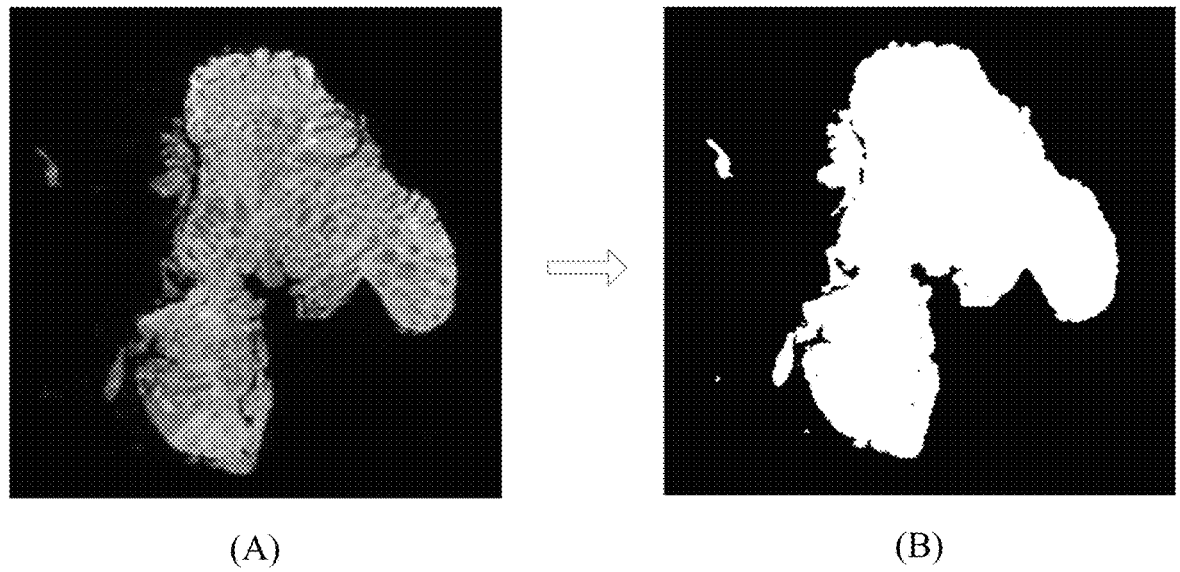
FIG. 5 is a schematic diagram a binarized image according to an embodiment of the disclosure.

In this embodiment, the medical image processing apparatus may perform binarization processing on the difference image generated in operation 102, to obtain the binarized image. A foreground region of the binarized image corresponds to a pathological tissue region of the to-be-processed medical image. For ease of understanding, refer to FIG. 5. FIG. 5 is a schematic diagram of an embodiment of a binarized image according to an embodiment of the disclosure. As shown in FIG. 5, according to a difference image shown in (A) of FIG. 5, because the difference image is a gray-scale image, processing based on the gray-scale image may be performed. In this embodiment, foreground processing is performed in an adaptive binarization manner, that is, binarization processing is performed on the difference image, thereby obtaining the binarized image shown in (B) of FIG. 5. In addition, in the binarized image, white is a foreground region that includes the pathological tissue region, and black is a background region that does not include the pathological tissue region.

Figure 6:
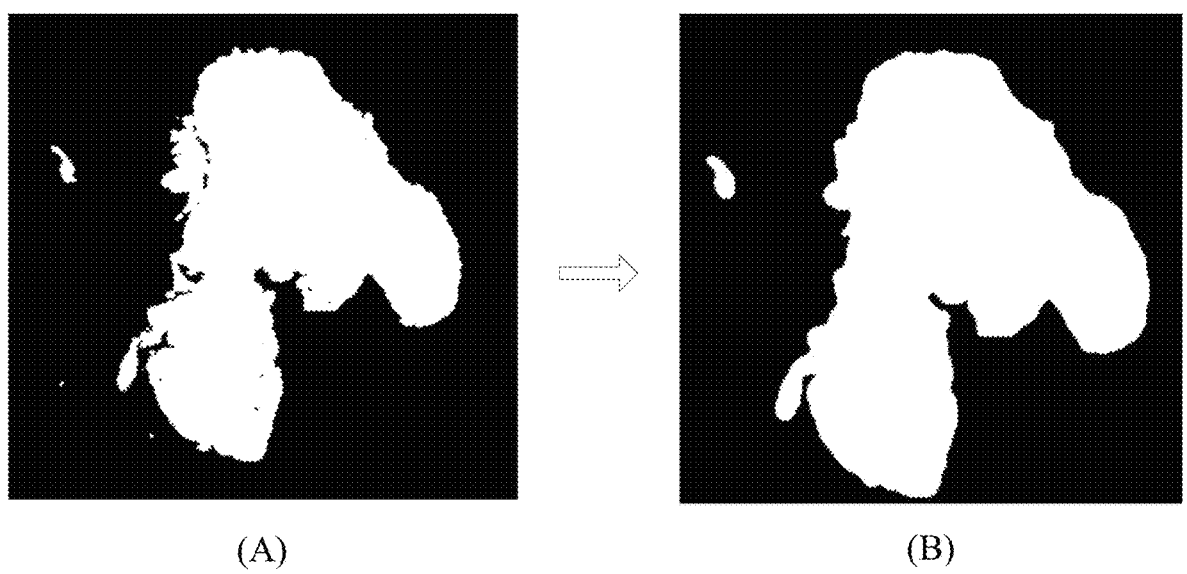
FIG. 6 is a schematic diagram of a result image according to an embodiment of the disclosure.

For ease of understanding, refer to FIG. 6. FIG. 6 is a schematic diagram of an embodiment of a foreground region according to an embodiment of the disclosure. As shown in FIG. 6, according to the binarized image shown in (A) of FIG. 6, because white is a foreground region that includes the pathological tissue region, and black is a background region that does not include the pathological tissue region, a region corresponding to a to-be-processed medical image in (B) of FIG. 6 may be generated according to the binarized image.

In this embodiment of the disclosure, a medical image processing method is provided. In the foregoing manner, color information of a gray-scale pixel in different channels is slightly different, and color information of a color pixel in different channels is greatly different. Therefore, a difference image is generated based on color information of different channels before binarization processing is performed on an image, thereby effectively using the color information in the image. The pathological tissue region extracted based on the difference image is more accurate and facilitates subsequent image analysis.

Based on the embodiment corresponding to FIG. 2, in an example embodiment of the medical image processing method provided in the embodiments of the disclosure, the generating the difference image according to the first image data, the second image data, and the third image data included in the to-be-processed medical image may include:

generating a maximum value image and a minimum value image according to the first image data, the second image data, and the third image data included in the to-be-processed medical image; and generating the difference image according to the maximum value image and the minimum value image.

In this embodiment, after obtaining the to-be-processed medical image, the medical image processing apparatus may generate the maximum value image and the minimum value image according to the first image data, the second image data, and the third image data included in the to-be-processed medical image; and finally generate the difference image according to the maximum value image and the minimum value image.

Specifically, for example, the image color mode of the to-be-processed medical image is RGB. Because the first image data, the second image data, and the third image data included in the to-be-processed medical image respectively correspond to color information in different channels, the color information is expressed as pixel values corresponding to an R channel, a G channel, and a B channel. A maximum value in the R channel, the G channel, and the B channel is determined, and the maximum value image is determined based on the maximum value. Similarly, a minimum value in the R channels, the G channel, and the B channel may be determined, and a minimum value image may be determined based on the minimum value. Then, each pixel of the minimum value image is subtracted from a pixel in a corresponding location of the maximum value image, to obtain the difference image.

This embodiment of the disclosure provides a method for generating the difference image. In the foregoing manner, the maximum value image and the minimum value image are generated according to the first image data, the second image data, and the third image data. Because different image data corresponds to different color information and the maximum value image and the minimum value image are determined according to different image data, color information of the included to-be-processed medical image is highly accurate, and therefore the difference image is more accurately generated.

Based on the embodiment corresponding to FIG. 2, in another example embodiment of the medical image processing method, the generating the maximum value image and the minimum value image according to the first image data, the second image data, and the third image data included in the to-be-processed medical image may include:

determining the maximum pixel value and the minimum pixel value according to a first pixel value of a first pixel location of the first image data, a second pixel value of a second pixel location of the second image data, and a third pixel value of a third pixel location of the third image data; and obtaining the maximum value image according to the maximum pixel value, and obtaining the minimum value image according to the minimum pixel value;

where a pixel value of a fourth pixel location of the maximum value image is the maximum pixel value, a pixel value of a fifth pixel location of the minimum value image is the minimum pixel value, and the first pixel location, the second pixel location, the third pixel location, the fourth pixel location, and the fifth pixel location all correspond to the same pixel location of the to-be-processed medical image; and the generating the difference image according to the maximum value image and the minimum value image may include:

determining a pixel difference according to the pixel value of the fourth pixel location of the maximum value image and the pixel value of the fifth pixel location of the minimum value image; and obtaining the difference image according to the pixel difference, where a pixel value of a sixth pixel location of the difference image is the pixel difference, and the fourth pixel location, the fifth pixel location, and the sixth pixel location all correspond to the same pixel location of the to-be-processed medical image.

A minimum pixel value corresponding to a target pixel in the minimum value image is subtracted from a maximum pixel value corresponding to a target pixel in the maximum value image, to obtain a pixel difference, and the pixel difference is used as a difference pixel value corresponding to a target pixel in the difference image.

In this embodiment, the medical image processing apparatus may generate, according to the first image data, the second image data, and the third image data included in the to-be-processed medical image, the maximum pixel value and the minimum pixel value corresponding to the target pixel; and then generate the maximum value image and the minimum value image according to the determined maximum pixel value and minimum pixel value. Finally, the minimum pixel value corresponding to the target pixel in the minimum value image is subtracted from the maximum pixel value corresponding to the target pixel in the maximum value image, to obtain the difference pixel value corresponding to the target pixel in the difference image.

For ease of understanding, for example, the image color mode of the to-be-processed medical image is RGB. For the to-be-processed medical image that includes the first image data, the second image data, and the third image data, each pixel of the to-be-processed medical image has corresponding image data in all of an R channel, a G channel, and a B channel. For example, image data of the pixel in the R channel is a first pixel value, image data of the pixel in the G channel is a second pixel value, and image data of the pixel in the B channel is a third pixel value. A maximum pixel value and a minimum pixel value in the R channel, the G channel, and the B channel may be determined according to the first pixel value, the second pixel value, and the third pixel value.

Further, a maximum pixel value and a minimum pixel value of a pixel location (x, y) may be calculated based on the following formula:

$$I\max(x,y) = \text{Max}[Ir(x,y), Ig(x,y), Ib(x,y)]; \text{ and}$$

$$I\min(x,y) = \text{Min}[Ir(x,y), Ig(x,y), Ib(x,y)];$$

where Imax (x, y) represents the maximum pixel value, Imin (x, y) represents the minimum pixel value, Ir (x, y) represents the first pixel value, Ig (x, y) represents the second pixel value, and Ib (x, y) represents the third pixel value.

In this embodiment, color information corresponding to different channels is used to distinguish pixel values. Still for example, the image color mode of the to-be-processed medical image is RGB. If the to-be-processed medical image is gray, RGB are similar. If the to-be-processed medical image is in color, RGB are greatly different and a region with a pathological tissue is in color, and a color value is the pixel value required in this embodiment. In the foregoing formulas, only a pixel corresponding to a two-dimensional image is used as an example. In actual application, the formulas are also applicable to calculation of a maximum pixel value and a minimum pixel value of a multi-dimensional image, for example, a 3-dimensional (3D) image and a 4-dimensional (4D) image.

To further understand this embodiment, for example, a target pixel location is (x1, y1) and the image color mode of the to-be-processed medical image is RGB. A first pixel value Ir (x1, y1) of the target pixel location (x1, y1) is 100, a second pixel value Ig (x1, y1) of the target pixel location (x1, y1) is 200, and a third pixel value Ib (x1, y1) of the target pixel location (x1, y1) is 150. As can be seen from the foregoing formulas, a maximum pixel value Imax (x1, y1) of the target pixel location (x1, y1) is the pixel value 200 corresponding to the second pixel value Ig (x1, y1), and a minimum pixel value Imin (x1, y1) of the target pixel location (x1, y1) is the pixel value 100 corresponding to the first pixel value Ir (x1, y1).

Then, for another example, a target pixel location is (x2, y2) and the image color mode of the to-be-processed medical image is RGB. A first pixel value Ir (x2, y2) of the target pixel location (x2, y2) is 30, a second pixel value Ig (x2, y2) of the target pixel location (x2, y2) is 80, and a third pixel value Ib (x2, y2) of the target pixel location (x2, y2) is 120. As can be seen from the foregoing formulas, a maximum pixel value Imax (x2, y2) of the target pixel location (x2, y2) is the pixel value 120 corresponding to the third pixel value Ib (x2, y2), and a minimum pixel value Imin (x2, y2) of the target pixel location (x2, y2) is the pixel value 30 corresponding to the first pixel value Ir (x2, y2).

Still, for another example, the image color mode of the to-be-processed medical image is RGB, the to-be-processed medical image is a 3D image, and a target pixel location is (x3, y3, z3). A first pixel value Ir (x3, y3, z3) of the target pixel location (x3, y3, z3) is 200, a second pixel value Ig (x3, y3, z3) of the target pixel location (x3, y3, z3) is 10, and a third pixel value Ib (x3, y3, z3) of the target pixel location (x3, y3, z3) is 60. As can be seen from the foregoing formulas, a maximum pixel value Imax (x3, y3, z3) of the target pixel location (x3, y3, z3) is the pixel value 200 corresponding to the first pixel value Ir (x3, y3, z3), and a minimum pixel value Imin (x3, y3, z3) of the target pixel location (x3, y3, z3) is the pixel value 10 corresponding to the second pixel value Ig (x3, y3, z3).

Further, after the maximum pixel value and the minimum pixel value corresponding to the target pixel location are determined, the minimum pixel value may be subtracted from the maximum pixel value to obtain a difference pixel value corresponding to the target pixel location in the difference image. Specifically, the difference pixel value may be calculated based on the following formula according to the maximum pixel value Imax (x, y) and the minimum pixel value Imin (x, y), and it is assumed that the to-be-processed medical image includes 10,000 pixels:

$Idiff(x,y)=I\max(x,y)-I\min(x,y);$ where Imax (x, y) represents the maximum pixel value, Imin (x, y) represents the minimum pixel value, and Idiff (x, y) represents the difference pixel value in the location (x, y).

For ease of understanding, for example, a target pixel location is (x1, y1) and the image color mode of the to-be-processed medical image is RGB. A maximum pixel value Imax (x1, y1) of the target pixel location (x1, y1) is 200, and a minimum pixel value Imin (x1, y1) of the target pixel location (x1, y1) is 100. The minimum pixel value Imin (x1, y1) may be subtracted from the maximum pixel value Imax (x1, y1), to obtain a difference pixel value 100 corresponding to the target pixel location (x1, y1). Then, for another example, a target pixel location is (x2, y2) and the image color mode of the to-be-processed medical image is RGB. A maximum pixel value Imax (x2, y2) of the target pixel location (x2, y2) is 120, and a minimum pixel value Imin (x2, y2) of the target pixel location (x2, y2) is 30. The minimum pixel value Imin (x2, y2) may be subtracted from the maximum pixel value Imax (x2, y2), to obtain a difference pixel value 90 corresponding to the target pixel location (x2, y2).

For another example, the image color mode of the to-be-processed medical image is RGB, the to-be-processed medical image is a 3D image, and a target pixel location is (x3, y3, z3). Based on the foregoing formulas, the following formulas may be derived:

$I\max(x,y,z)=\operatorname{Max}[Ir(x,y,z),Ig(x,y,z),Ib(x,y,z)];$ $I\min(x,y,z)=\operatorname{Min}[Ir(x,y,z),Ig(x,y,z),Ib(x,y,z)];$ and $Idiff(x,y,z)=I\max(x,y,z)-I\min(x,y,z).$ It is assumed that a maximum pixel value Imax (x3, y3, z3) of the target pixel location (x3, y3, z3) is 200, and a minimum pixel value Imin (x3, y3, z3) of the target pixel location (x3, y3, z3) is 10. The minimum pixel value Imin (x3, y3, z3) may be subtracted from the maximum pixel value Imax (x3, y3, z3), to obtain a difference pixel value 190 corresponding to the target pixel location (x3, y3, z3).

Specifically, when the difference pixel value of the to-be-processed medical image is small, it indicates that the first pixel value, the second pixel value, and the third pixel value of the to-be-processed medical image are similar. It may indicate that the to-be-processed medical image is similar to a gray image. When the difference pixel value of the to-be-processed medical image is large, it indicates that the first pixel value, the second pixel value, and the third pixel value of the to-be-processed medical image are greatly different. It may indicate that the to-be-processed medical image is similar to a color image, and an image with a pathological tissue region is often a color image. Therefore, it may be preliminarily determined, according to the difference pixel value, whether the to-be-processed medical image includes a pathological tissue region.

This embodiment of the disclosure provides a method for generating a maximum value image and a minimum value image. In the foregoing manner, a maximum pixel value and a minimum pixel value are determined based on pixel values of a target pixel corresponding to first image data, second image data, and third image data. The maximum pixel value and the minimum pixel value reflect color information of the to-be-processed medical image to some extent. The minimum pixel value is subtracted from the maximum pixel value to obtain a difference pixel value. Therefore, the difference pixel value can accurately reflect color information of the to-be-processed medical image, and therefore the difference image is more accurately generated.

Based on the embodiment corresponding to FIG. 2, in another example embodiment of the medical image processing method, the generating the difference image according to the first image data, the second image data, and the third image data included in the to-be-processed medical image may include:

generating a to-be-processed difference image according to the first image data, the second image data, and the third image data included in the to-be-processed medical image; and performing Gaussian blur processing on the to-be-processed difference image, to obtain the difference image.

In this embodiment, the medical image processing apparatus may generate the to-be-processed difference image according to the first image data, the second image data, and the third image data included in the to-be-processed medical image, and then perform Gaussian blur processing on the to-be-processed difference image, to obtain the difference image.

Specifically, blur may be understood as follows: for each pixel of the to-be-processed difference image, an average of surrounding pixels of the pixel is obtained. When the average of the surrounding pixels of the pixel is obtained for the pixel, a value of the pixel may tend to be smooth. This is equivalent to producing a blur effect on the to-be-processed difference image, and details of the pixel are lost. Pixels of the to-be-processed difference image are continuous. Therefore, pixels that are close to each other are closely correlated, and pixels that are far away from each other are alienated from each other. Therefore, in this embodiment, a blur algorithm is Gaussian blur (GB). In Gaussian blur, normal distribution (Gaussian distribution) may be used to process the to-be-processed difference image, so that weighted averaging of pixels is more appropriate. A pixel that is closer has a larger weight and a pixel that is farther has a smaller weight.

Further, for example, a pixel is (x, y). The pixel (x, y) is a two-dimensional pixel. Therefore, a two-dimensional Gaussian function may be calculated based on the following formula:

$$G(x, y) = \frac{1}{2\pi\sigma^2} e^{-(x^2+y^2)/2\sigma^2};$$

where (x, y) represents a pixel, G(x, y) represents a two-dimensional Gaussian function of a pixel, and σ represents a standard deviation of normal distribution.

For ease of understanding, for example, the pixel is specifically (0, 0). Then, surrounding 8 pixels of the pixel (0, 0) may be (−1, 1), (0, 1), (1, 1), (−1, 0), (1, 0), (−1, −1), (0, −1), and (1, −1). To further calculate a weight matrix, a value of σ needs to be set. Assuming that σ=1.5, a weight matrix with a blur radius 1 may be obtained. For example, in the weight matrix, a weight corresponding to the pixel (0, 0) is 0.0707, a weight corresponding to the pixel (−1, 1) is 0.0453, a weight corresponding to the pixel (0, 1) is 0.0566, a weight corresponding to the pixel (1, 1) is 0.0453, a weight corresponding to the pixel (−1, 0) is 0.0566, a weight corresponding to the pixel (1, 0) is 0.0566, a weight corresponding to the pixel (−1, −1) is 0.0453, a weight corresponding to the pixel (0, −1) is 0.0566, and a weight corresponding to the pixel (1, −1) is 0.0453. A sum of the weights of the pixel (0, 0) and the 8 surrounding pixels is approximately 0.479. If only a weighted average of these 9 points is calculated, the sum of weights of these 9 points needs to be 1, that is, the sum of the weights is normalized. To be specific, the 9 values corresponding to the weight matrix may be divided by the sum 0.479 of the weights, to obtain the normalized weight matrix. To be specific, a weight corresponding to the pixel (0, 0) after normalizing is 0.147, a weight corresponding to the pixel (−1, 1) after normalizing is 0.0947, a weight corresponding to the pixel (0, 1) after normalizing is 0.0118, a weight corresponding to the pixel (1, 1) after normalizing is 0.0947, a weight corresponding to the pixel (−1, 0) after normalizing is 0.0118, a weight corresponding to the pixel (1, 0) after normalizing is 0.0118, a weight corresponding to the pixel (−1, −1) after normalizing is 0.0947, a weight corresponding to the pixel (0, −1) after normalizing is 0.0118, and a weight corresponding to the pixel (1, −1) after normalizing is 0.0947. A weight matrix whose weight sum is greater than 1 makes the difference image bright, and a weight matrix whose weight sum is less than 1 makes the difference image dark. Therefore, the normalized weight matrix can make a pathological tissue region presented by the difference image more accurate.

Further, after the normalized weight matrix is obtained, Gaussian blur calculation may be performed on the pixel. For example, when gray-scale values are from 0 to 255, in the weight matrix, a gray-scale value corresponding to the pixel (0, 0) is 25, a gray-scale value corresponding to the pixel (−1, 1) is 14, a gray-scale value corresponding to the pixel (0, 1) is 15, a gray-scale value corresponding to the pixel (1, 1) is 16, a gray-scale value corresponding to the pixel (−1, 0) is 24, a gray-scale value corresponding to the pixel (1, 0) is 26, a gray-scale value corresponding to the pixel (−1, −1) is 34, a gray-scale value corresponding to the pixel (0, −1) is 35, and a gray-scale value corresponding to the pixel (1, −1) is 36. Point multiplication may be performed on a gray-scale value corresponding to each pixel and a weight corresponding to the pixel, to obtain 9 values. To be specific, 3.69 may be obtained for the pixel (0, 0), 1.32 may be obtained for the pixel (−1, 1), 1.77 may be obtained for the pixel (0, 1), 1.51 may be obtained for the pixel (1, 1), 2.83 may be obtained for the pixel (−1, 0), 3.07 may be obtained for the pixel (1, 0), 3.22 may be obtained for the pixel (−1, −1), 4.14 may be obtained for the pixel (0, −1), and 3.41 may be obtained for the pixel (1, −1). Then, the 9 values are added to obtain a Gaussian blur value of the pixel (0, 0).

Operations similar to those of the pixel (0, 0) may be performed on all pixels included in the to-be-processed difference image to obtain the difference image after Gaussian blur processing.

This embodiment of the disclosure provides another method for generating the difference image. In the foregoing manner, Gaussian blur processing is performed on the generated to-be-processed difference image. Because Gaussian blur processing can improve processing robustness, the obtained difference image has better processing robustness, thereby improving stability of the difference image.

Based on the embodiment corresponding to FIG. 2, in another example embodiment of the medical image processing method, the performing binarization processing on the difference image to obtain the binarized image may include:

determining a binarization threshold according to the difference image; and performing binarization processing on the difference image according to the binarization threshold, to obtain the binarized image.

In this embodiment, the medical image processing apparatus may determine the binarization threshold according to the difference image, when a pixel value corresponding to a pixel in the difference image is greater than or equal to the binarization threshold, determine the pixel as a foreground pixel of the binarized image, and when a pixel value corresponding to a pixel in the difference image is less than the binarization threshold, determine the pixel as a background pixel of the binarized image.

Specifically, the binarization threshold may be set to perform binarization processing on the difference image, to convert a gray-scale image to a binarized image with values 0 or 1. To be specific, in binarization of the difference image, the binarization threshold may be set to convert the difference image to the binarized image whose image foreground and image background are respectively represented by only two values (0 or 1). A foreground value is 1 and a background value is 0. In actual application, 0 corresponds to that RGB values are all 0, and 1 corresponds to that RGB values are all 255. Binarization processing is performed on the difference image to obtain the binarized image. Then, when the binarized image is further processed, because a geometric property of the binarized image is only related to locations of 0 and 1 and is no longer related to a gray-scale value of a pixel, processing of the binarized image becomes simple, thereby improving image processing efficiency. Methods for determining the binarization threshold may be divided into a global threshold method and a local threshold method. The global threshold method means that the entire difference image is divided with one threshold. However, gray-scale depths of different difference images are different. Brightness distribution of different parts of the same difference image may also be different. Therefore, in this embodiment, the binarization threshold is determined by using a dynamic threshold binarization method.

After the binarization threshold is determined according to the difference image, a pixel value corresponding to a pixel in the difference image is compared with the binarization threshold. When a pixel value corresponding to a pixel in the difference image is greater than or equal to the binarization threshold, the pixel is determined as a foreground pixel of the binarized image. When a pixel value corresponding to a pixel in the difference image is less than the binarization threshold, the pixel is determined as a background pixel of the binarized image. For example, when a pixel value corresponding to a pixel A is greater than the binarization threshold, the pixel A is determined as a foreground pixel of the binarized image, that is, a pixel value is 1. To be specific, the pixel A is in a foreground region and is displayed in white when the image is in an RGB mode. When a pixel value corresponding to a pixel B is less than the binarization threshold, the pixel B is determined as a background pixel of the binarized image, that is, a pixel value is 0. To be specific, the pixel B is in a background region and is displayed in black when the image is in an RGB mode.

This embodiment of the disclosure provides a method for obtaining the binarized image. In the foregoing manner, the binarized image is generated according to binarization processing. Because a geometric property of the binarized image is not related to a gray-scale value of a pixel, subsequent processing of the binarized image may become simple, thereby improving result image generation efficiency.

Based on the embodiment corresponding to FIG. 2, in another example embodiment of the medical image processing method, the determining the binarization threshold according to the difference image may include:

obtaining, according to the difference image, N pixel values corresponding to N pixels, where the pixel value and the pixel are in a one-to-one correspondence, and N is an integer greater than 1;

determining a reference pixel value in the N pixel values, where the reference pixel value is a maximum value of the N pixel values; and calculating the binarization threshold according to the reference pixel value and a preset proportion.

In this embodiment, the medical image processing apparatus may obtain, according to the difference image, the N pixel values corresponding to the N pixels, where the pixel value and the pixel are in a one-to-one correspondence, then determine the reference pixel value from the N pixel values, where the reference pixel value is a maximum value of the N pixel values, and finally may calculate the binarization threshold according to the reference pixel value and the preset ratio, where N is an integer greater than 1.

Specifically, in this embodiment, the binarization threshold is determined according to the difference image. The difference image may be generated by subtracting the minimum value image from the maximum value image in the to-be-processed medical image, and the pixel value and the pixel in the difference image are in a one-to-one correspondence. Therefore, pixel values corresponding to a plurality of pixels in the difference image may be obtained. Then, a maximum value of the plurality of pixel values is determined as the reference pixel value. Then, the binarization threshold is calculated according to the reference pixel value and the preset ratio. For ease of understanding, in this embodiment, for example, the preset ratio is 10%. For example, the length and the width of the WSI image that is scaled down fall within several thousands of pixels. It is assumed that the image that is scaled down includes 100*100 pixels, that is, a maximum value needs to be found from pixel values corresponding to the 10000 pixels. For example, the maximum value is 150. Then, it may be determined that the maximum value 150 is the reference pixel value. Then, the reference pixel value 150 may be multiplied by the preset ratio 10%, to obtain the binarization threshold 15. During actual application, the preset ratio further may be a value corresponding to another percentage, and a specific preset ratio should be flexibly determined with reference to an actual case.

This embodiment of the disclosure provides another method for obtaining the binarization threshold. In the foregoing manner, the binarization threshold may be determined based on the reference pixel value determined as the maximum pixel value and the preset ratio. Gray-scale depths of difference images are different. Besides, brightness distribution of different regions may also be different. Therefore, the binarization threshold may be flexibly determined by adjusting the preset ratio, to improve threshold accuracy and flexibility, and the binarized image is more accurately generated.

Based on the embodiment corresponding to FIG. 2, in another example embodiment of the medical image processing method, the method may further include:

detecting a background region in the binarized image based on a flood algorithm, where the background region includes a plurality of background pixels;

obtaining background pixels in a foreground region in the binarized image according to the binarized image and the background region in the binarized image, where the foreground region includes a plurality of foreground pixels;

changing the background pixels in the foreground region in the binarized image to foreground pixels, to obtain a hole filling image; and performing median filtering processing on the hole filling image, to obtain a result image, where a foreground region of the result image corresponds to the pathological tissue region of the to-be-processed medical image.

In this embodiment, the medical image processing apparatus may detect a background region of the binarized image based on a flood algorithm, where the background region may include a plurality of background pixels, then obtain background pixels in the foreground region of the binarized image according to the binarized image and the background region of the binarized image, where the foreground region may include a plurality of foreground pixels, then change the background pixels in the foreground region of the binarized image to foreground pixels to obtain the hole filling image, and finally may perform median filtering processing on the hole filling image, to obtain the result image. A foreground region of the result image corresponds to a pathological tissue region of the to-be-processed medical image.

Figure 7:
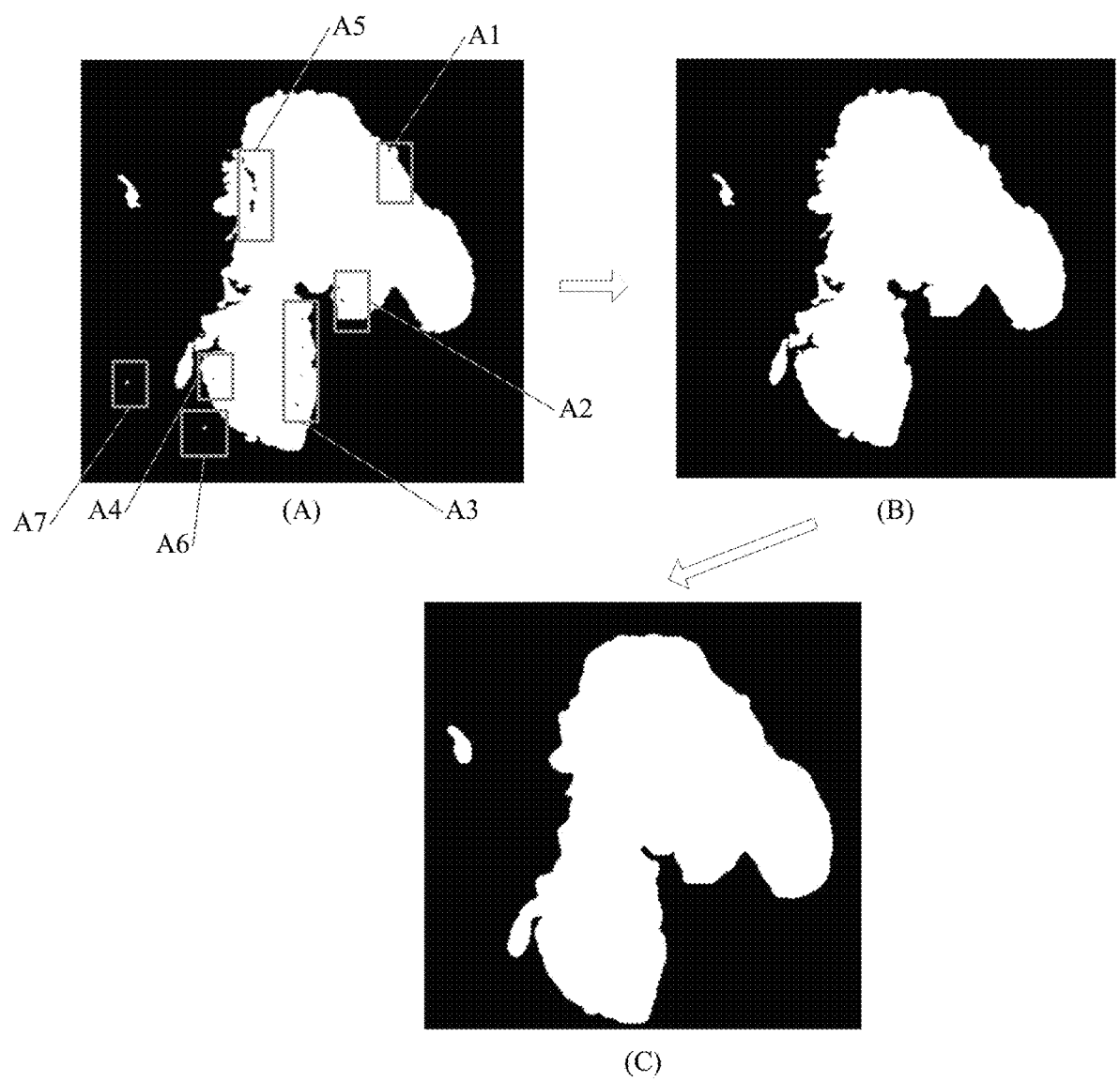
FIG. 7 is a schematic diagram of a result image according to an embodiment of the disclosure.

Specifically, after binarization processing is performed on the difference image, a foreground region in the obtained binarized image may be a black hole. The black hole needs to be detected in the foreground region. For ease of understanding, refer to FIG. 7. FIG. 7 is a schematic diagram of another embodiment of a result image according to an embodiment of the disclosure. As shown in FIG. 7, a white foreground region in the binarized image shown in (A) of FIG. 7 includes a plurality of background pixels. Black dots encircled by a region A1 to a region A5 are all formed by background pixels, and the black dots encircled by the region A1 to the region A5 are changed from background pixels to foreground pixels. White points encircled by a region A6 and a region A7 are formed by foreground pixels, and the white points encircled by the region A6 and the region A7 are changed from foreground pixels to background pixels. In this way, a hole filling image shown in (B) of FIG. 7 may be obtained.

Further, median filtering processing is then performed on the hole filling image shown in (B) of FIG. 7, and morphological processing may be further performed on the hole filling image, that is, a result image shown in (C) in FIG. 7 may be obtained. Filtering processing is to suppress noise of the to-be-processed medical image while maintaining detail features of the hole filling image as much as possible, and filtering processing can improve effectiveness and reliability of subsequent processing and analysis of the result image. Eliminating a noise component in the hole filling image is a filtering operation. Energy of the hole filling image is mostly concentrated in low and intermediate bands of an amplitude spectrum. In a high band, information of the hole filling image is often affected by noise. Therefore, a filtering operation may be performed on the hole filling image, to adapt to an image processing requirement and eliminate noise mixed when the image is digitalized. Median filtering processing is typical non-linear filtering, and is a non-linear signal processing technology that can effectively suppress noise based on a sorting statistics theory. In median filtering processing, a median value of neighborhood gray-scale values of a pixel may replace a gray-scale value of the pixel, and surrounding pixel values are close to a real value to eliminate isolated noise points.

This embodiment of the disclosure provides a method for generating the result image. In the foregoing manner, the background pixels in the foreground region are changed to the foreground pixels, and the obtained hole filling image is highly reliable. Besides, through the median filtering processing, the result image corresponding to the to-be-processed medical image is clear and has a desirable visual effect without damaging feature information such as the outline and the edge of the image.

Based on the embodiment corresponding to FIG. 2, in another example embodiment of the medical image processing method, the performing median filtering processing on the hole filling image may include:

performing median filtering processing on the hole filling image, to obtain a filtered image, where a foreground region of the result image corresponds to the pathological tissue region of the to-be-processed medical image;

obtaining a boundary line of a foreground region in the filtered image, where the boundary line includes M pixels, and M is an integer greater than 1; and extending each of the M pixels of the boundary line outwards by K pixels, to obtain the result image, where K is an integer greater than or equal to 1.

In this embodiment, the medical image processing apparatus performs median filtering processing on the hole filling image, where the filtered image may include a to-be-processed foreground region, obtains a boundary line of the foreground region of the filtered image, where the boundary line includes M pixels, and extends each of the M pixels on the boundary line outwards by K pixels to obtain the result image, where M is an integer greater than 1 and K is an integer greater than or equal to 1. Specifically, in median filtering processing, a median value of neighborhood gray-scale values of a pixel may replace a gray-scale value of the pixel, and surrounding pixel values are close to a real value to eliminate isolated noise points. Through median filtering processing, the filtered image that reserves image edge details is obtained while impulse noise and salt and pepper noise are eliminated.

Further, connected regions with different similar colors are filled based on a flood algorithm (Flood Fill). The basic principle of the flood algorithm is starting from a pixel and expanding and coloring to surrounding pixels until the boundary of a graph. The flood algorithm needs to use three parameters: a start node (start node), a target color (target color), and a replacement color (replacement color). In the flood algorithm, all start nodes are connected through a path of the target color, and the start nodes are changed to the replacement color. During actual application, the flood algorithm may be constructed in a plurality of manners, but the plurality of manners explicitly or implicitly use a queue data structure or a stacking data structure. Examples are a four-neighborhood flood algorithm, an eight-neighborhood flood algorithm, a scanline fill algorithm (Scanline Fill), and large-scale behavior (Large-scale behavior). The idea of a conventional four-neighborhood flood algorithm is as follows: after a pixel (x, y) is colored, four upper, lower, left, and right points around the pixel are respectively colored. However, a large part of a memory is consumed in a recursive manner. If an area to be colored is very large, overflow is caused. Therefore, the four-neighborhood flood algorithm in a non-recursive manner may be used. The eight-neighborhood flood algorithm colors the upper, lower, left, and right parts, the upper left part, the lower left part, the upper right part, and the lower right part of a pixel. The scanline fill algorithm may be accelerated by using a filling line. Pixels on a line may be first colored, and then coloring sequentially expands upwards and downwards until coloring is completed. Large-scale behavior uses data as the center or uses a procedure as the center.

Because the boundary line of the hole filling image is irregular, in this embodiment, the scanline fill algorithm is used. For example, a to-be-processed foreground region includes a boundary line of 1000 pixels. 1000 pixels are respectively extended outwards by K pixels through morphological processing. Assuming that K is 2, 2000 pixels are added to the foreground region in addition to the original 1000 pixels, to obtain the result image. During actual application, specific M pixels and K pixels should all be flexibly determined with reference to an actual case.

This embodiment of the disclosure provides another method for generating the result image. In the foregoing manner, through the median filtering processing, the filtered image is clear and has a desirable visual effect without damaging feature information such as the outline and the edge of the image. Then, morphological processing is performed on the filtered image based on the flood algorithm, to improve accuracy and integrity of the result image.

Based on the embodiment corresponding to FIG. 2, in another example embodiment of the medical image processing method, the obtaining the to-be-processed medical image may include:

obtaining an original medical image;

extracting a medical sub-image from the original medical image based on the sliding window;

determining, based on the medical sub-image comprising the pathological tissue region, the medical sub-image as the to-be-processed medical image; and determining, based on the medical sub-image not comprising the pathological tissue region, the medical sub-image as a background image and remove the background image.

In this embodiment, the medical image processing apparatus may first obtain the original medical image, extract the medical sub-image from the original medical image by using the sliding window, when detecting that the medical sub-image includes the pathological tissue region, determine the medical sub-image as a to-be-processed medical image, and when detecting that the medical sub-image does not include the pathological tissue region, determine the medical sub-image as a background image and remove the background image. Specifically, the original medical image may be an image received by the medical image processing apparatus through a wired network, or may be an image stored by the medical image processing apparatus.

Figure 8:
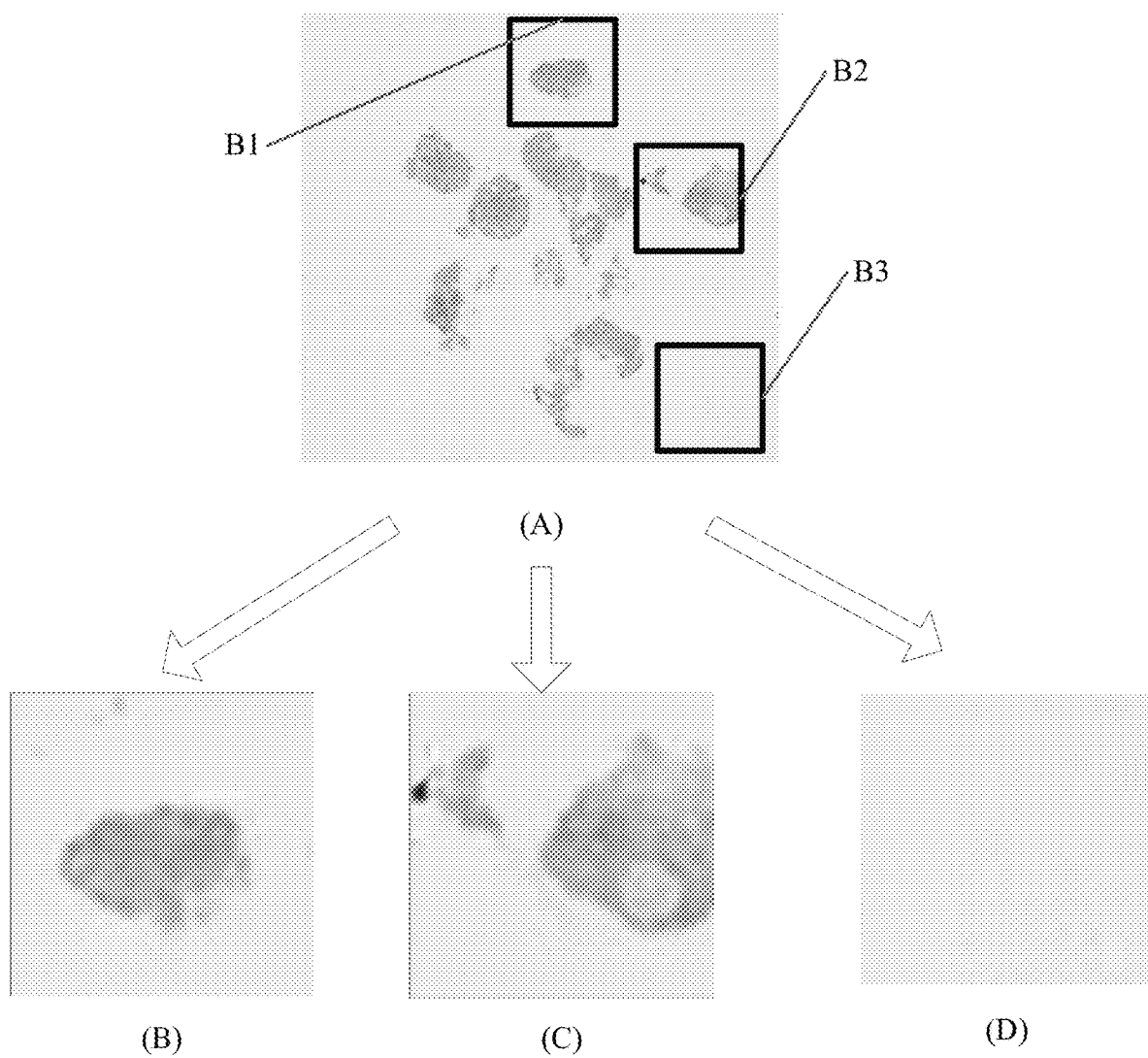
FIG. 8 is a schematic diagram of obtaining a to-be-processed medical image according to an embodiment of the disclosure.

For ease of understanding, refer to FIG. 8. FIG. 8 is a schematic diagram of an embodiment of obtaining a to-be-processed medical image according to an embodiment of the disclosure. As shown in FIG. 8, (A) of FIG. 8 shows an original medical image. A medical sub-image is extracted from the original medical image by using a sliding window. Regions encircled by B1 to B3 are medical sub-images extracted from the original medical image. Thus, a medical sub-image shown in (B) of FIG. 8 may be correspondingly obtained in B1, a medical sub-image shown in (C) of FIG. 8 may be correspondingly obtained in B2, and a medical sub-image shown in (D) of FIG. 8 may be correspondingly obtained in B3. As can be seen, the medical sub-images shown in (B) and (C) of FIG. 8 include a pathological tissue region. Therefore, the medical sub-images shown in (B) and (C) of FIG. 8 may be determined as to-be-processed medical images. However, the medical sub-image shown in (D) of FIG. 8 does not include a pathological tissue region. Therefore, the medical sub-image shown in (D) of FIG. 8 may be determined as a background image and the background image is removed.

This embodiment of the disclosure provides a method for obtaining the to-be-processed medical image. In the foregoing manner, it is detected whether the medical sub-image includes the pathological tissue region, to determine the to-be-processed medical image, and the result image corresponding to the to-be-processed medical image that includes the pathological tissue region may be obtained through the foregoing operations. The result image includes the pathological tissue region. This facilitates subsequent processing and analysis of the pathological tissue region in the result image. Then, the medical sub-image that does not include the pathological tissue region is determined as a background image and the background image is removed, to reduce resource occupation.

Based on the embodiment corresponding to FIG. 2, in another example embodiment of the medical image processing method, after generating the result image according to the binarized image, the medical image processing method may further include:

generating a target positive sample image according to the result image, where the target positive sample image is a positive sample image in a positive sample set, and each positive sample image includes the pathological tissue region;

obtaining a negative sample set, where the negative sample set includes at least one negative sample image, and each negative sample image does not include the pathological tissue region; and training an image processing model based on the positive sample set and the negative sample set.

In this embodiment, after the result image is generated according to the binarized image, the medical image processing apparatus may further generate the target positive sample image according to the result image, where the target positive sample image is a positive sample image in the positive sample set, and each positive sample image includes a pathological tissue region. At the same time, the medical image processing apparatus may further obtain the negative sample set, where the negative sample set includes at least one negative sample image, and each negative sample image does not include a pathological tissue region. Finally, the medical image processing apparatus may train the image processing model based on the obtained positive sample set and negative sample set. The image processing model may perform processing to obtain a corresponding pathological tissue region based on a medical color image.

This embodiment of the disclosure provides a method for training the image processing model. In the foregoing manner, the image processing model is trained based on the positive sample image set that includes the pathological tissue region and the negative sample set that does not include the pathological tissue region. This improves accuracy and reliability of the image processing model, thereby improving image processing efficiency and accuracy.

Figure 9:
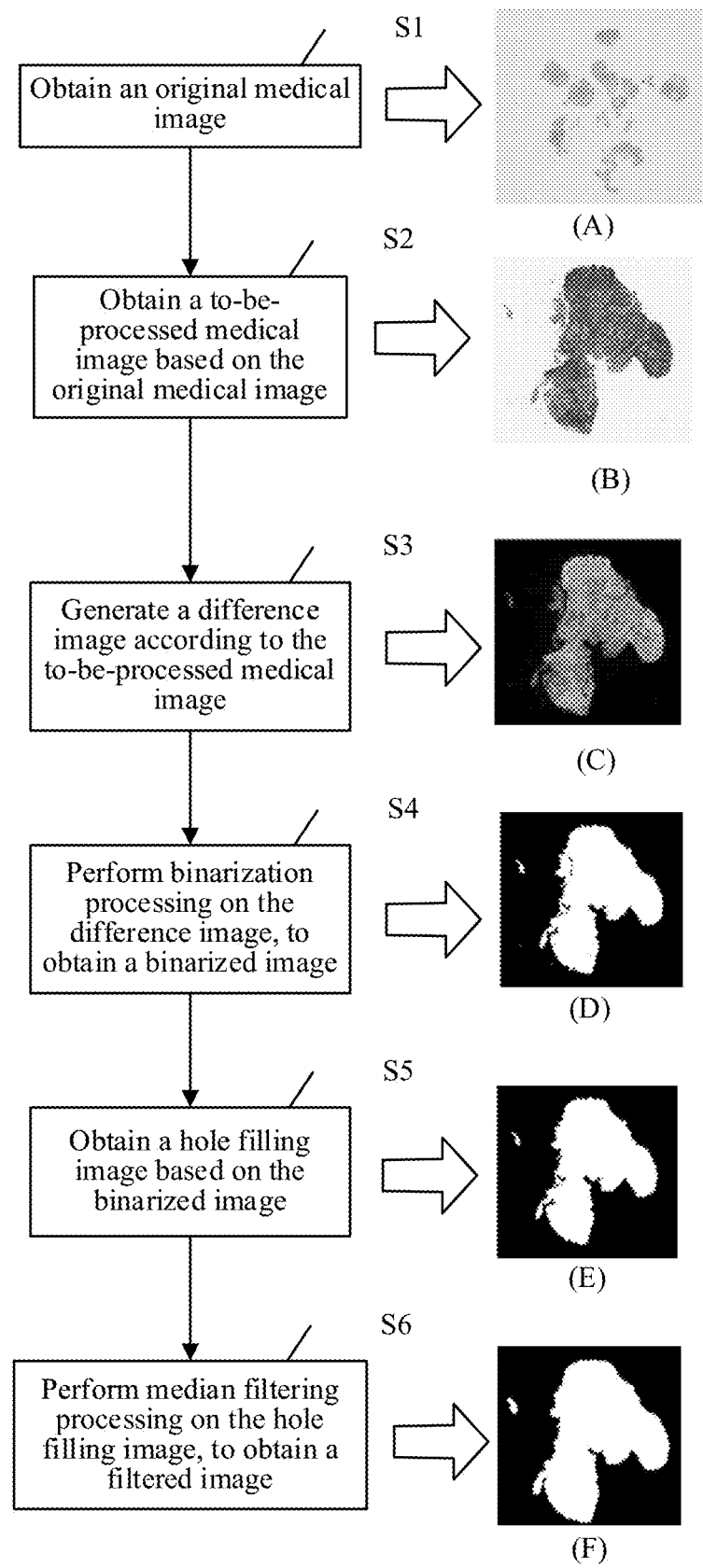
FIG. 9 is a schematic flowchart of a medical image processing method according to an embodiment of the disclosure.

Specifically, this embodiment of the disclosure can improve accuracy of the extracted pathological tissue region, and facilitate subsequent image analysis. For ease of understanding of this embodiment of the disclosure, refer to FIG. 9. FIG. 9 is a schematic flowchart of a medical image processing method according to an embodiment of the disclosure. Details are as follows:

Operation S1: Obtain an original medical image.

Operation S2: Obtain a to-be-processed medical image based on the original medical image.

Operation S3: Generate a difference image according to the to-be-processed medical image.

Operation S4: Perform binarization processing on the difference image, to obtain a binarized image.

Operation S5: Obtain a hole filling image based on the binarized image.

Operation S6: Perform median filtering processing on the hole filling image, to obtain a filtered image.

In operation S1, an original medical image shown in (A) of FIG. 9 may be obtained. Then, in operation S2, a medical sub-image is extracted from the original medical image shown in (A) of FIG. 9 by using a sliding window. When it is detected that the medical sub-image includes a pathological tissue region, the medical sub-image is determined as a to-be-processed medical image, to obtain a to-be-processed medical image shown in (B) of FIG. 9. Further, in operation S3, a maximum pixel value and a minimum pixel value corresponding to a target pixel may be determined in a first pixel value, a second pixel value, and a third pixel value according to first image data, second image data, and third image data included in the to-be-processed medical image; to generate a maximum value image and a minimum value image. Then, a difference image shown in (C) of FIG. 9 is obtained according to the maximum value image and the minimum value image. Further, in operation S4, N pixel values corresponding to N pixels may be obtained according to the difference image shown in (C) of FIG. 9, where the pixel value and the pixel are in a one-to-one correspondence. A maximum value of the N pixel values is determined as a reference pixel value, and a binarization threshold is calculated according to the reference pixel value and the preset ratio. In addition, when a pixel value corresponding to a pixel in the difference image is greater than or equal to the binarization threshold, the pixel is determined as a foreground pixel of the binarized image, and when a pixel value corresponding to a pixel in the difference image is less than the binarization threshold, the pixel is determined as a background pixel of the binarized image, to obtain a binarized image shown in (D) of FIG. 9. In operation S5, a background region including a plurality of background pixels in the binarized image is detected based on a flood algorithm, background pixels in a foreground region of the binarized image are obtained according to the binarized image and the background region of the binarized image, and the background pixels in the foreground region of the binarized image are changed to foreground pixels to obtain a hole filling image shown in (E) of FIG. 9. In operation S6, median filtering processing is performed on the hole filling image, to obtain a filtered image that includes a to-be-processed foreground region, a boundary line including M pixels in the to-be-processed foreground region is obtained, and each of the M pixels on the boundary line is extended outwards by K pixels to obtain a result image shown in (F) of FIG. 9, where M is an integer greater than 1.

Figure 10A:
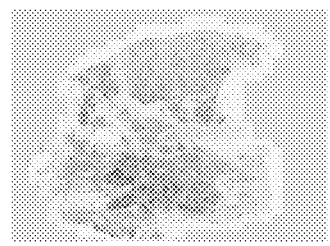
FIG. 10A is a schematic diagram of a to-be-processed medical image according to an embodiment of the disclosure.
Figure 10B:
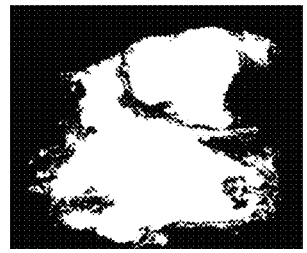
FIG. 10B is a schematic diagram of a result image according to an embodiment of the disclosure.
Figure 10C:
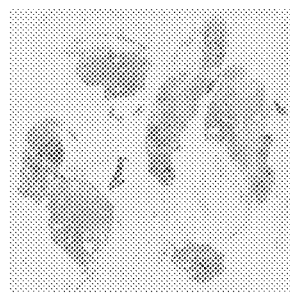
FIG. 10C is a schematic diagram of a to-be-processed medical image according to an embodiment of the disclosure.
Figure 10D:
FIG. 10D is a schematic diagram of a result image according to an embodiment of the disclosure.
Figure 10E:
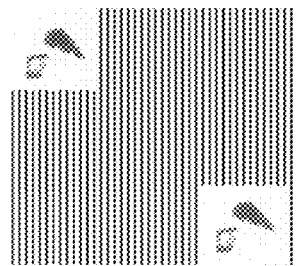
FIG. 10E is a schematic diagram of a to-be-processed medical image according to an embodiment of the disclosure.
Figure 10F:
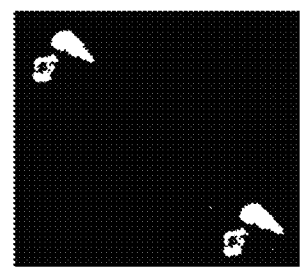
FIG. 10F is a schematic diagram of a result image according to an embodiment of the disclosure.

Further, result images may be generated for different to-be-processed medical images. As shown in FIG. 10A-10B, for a purely white and gray to-be-processed medical image shown in FIG. 10A, a result image shown in FIG. 10B may be obtained through the medical image processing method provided in the embodiments of the disclosure. FIG. 10C shows a to-be-processed medical image with regular vertical streaks. The regular vertical streaks are streaks produced when a scanner scans a glass slide, and the regular vertical streaks are produced depending on a scanning device. Then, a result image shown in FIG. 10D may be obtained through the medical image processing method provided in the embodiments of the disclosure. Then, FIG. 10E shows a to-be-processed medical image with black and white streaks. The black and white streaks may be generated through format conversion, or may be an unclear region generated when a scanner scans a glass slide, where black and white streaks are added to the region. Then, a result image shown in FIG. 10F may be obtained through the medical image processing method provided in the embodiments of the disclosure. As can be seen, the difference image is generated based on color information of different channels before binarization processing is performed on the image. Because color information of a gray-scale pixel in different channels is slightly different, color information of a color pixel in different channels is greatly different, and color information of various to-be-processed medical images in FIG. 10A-10F may be effectively used. The pathological tissue region extracted based on the difference image is more accurate and facilitates subsequent image analysis.

Figure 11:
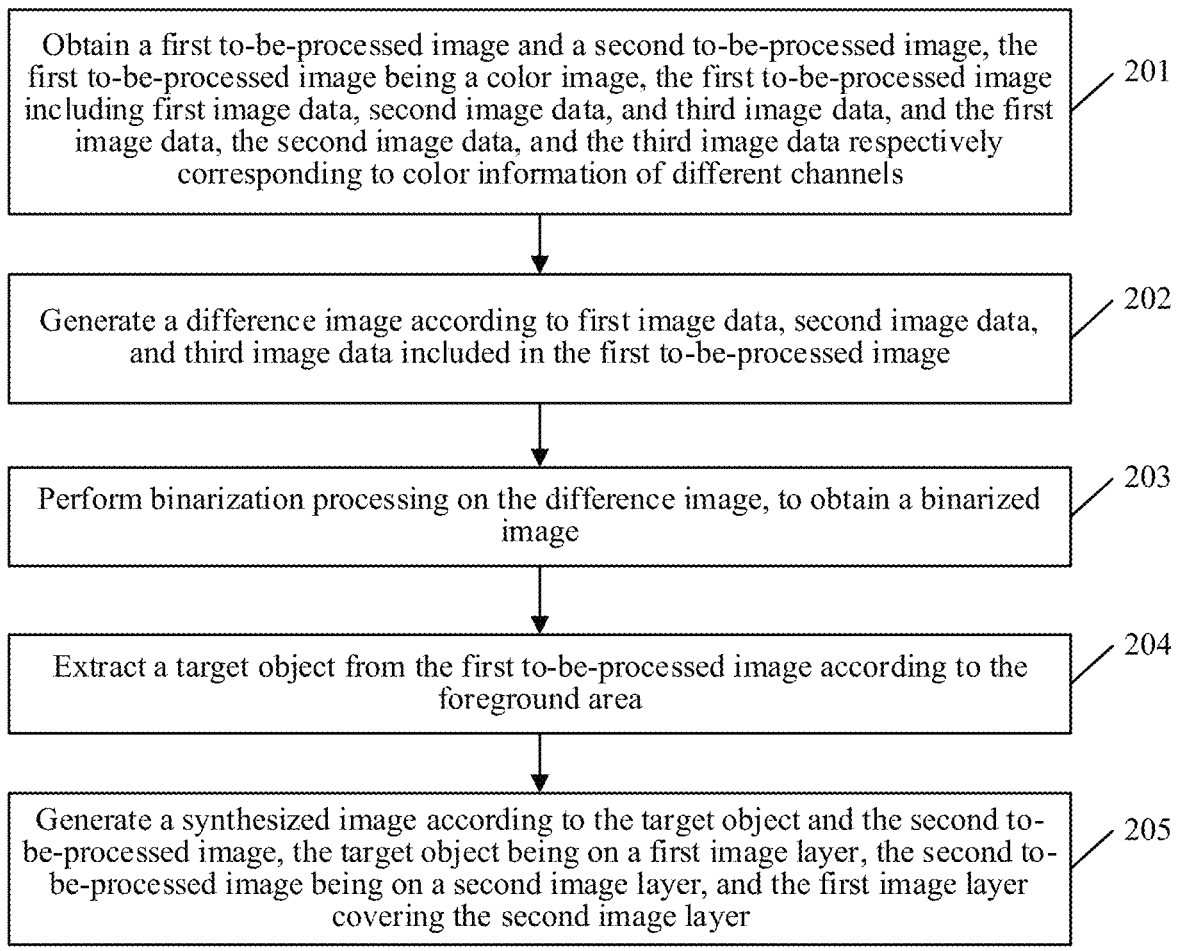
FIG. 11 is a schematic diagram of an image processing method according to an embodiment of the disclosure.

With reference to the foregoing descriptions, the following describes the image processing method in the disclosure. FIG. 11 is a schematic diagram of an embodiment of an image processing method according to an embodiment of the disclosure. As shown in FIG. 11, an embodiment of the image processing method in the disclosure includes:

201: Obtain a first to-be-processed image and a second to-be-processed image, the first to-be-processed image being a color image, the first to-be-processed image including first image data, second image data, and third image data, and the first image data, the second image data, and the third image data respectively corresponding to color information of different channels.

In this embodiment, an image processing apparatus may obtain the first to-be-processed image and the second to-be-processed image, where the first to-be-processed image may include first image data, second image data, and third image data, and the first image data, the second image data, and the third image data respectively correspond to color information of different channels. The first to-be-processed image and the second to-be-processed image may be images received by the image processing apparatus through a wired network, or may be images stored by the image processing apparatus. Specifically, the first to-be-processed image is similar to the to-be-processed medical image described in operation 101. Details are not described herein again.

In actual application, color information specifically corresponding to the first image data, the second image data, and the third image data should be flexibly determined with reference to an actual case. Besides, the image processing apparatus may be deployed on a server, and may also be deployed on a terminal device with a high computing capability. In this embodiment, for example, the image processing apparatus is deployed on a server.

Specifically, assuming that the first to-be-processed image is an image shot on a cloudy day, the background of the image is a cloudy day and further includes a red car. The second to-be-processed image is an image of the blue sky and sea.

202: Generate a difference image according to the first image data, the second image data, and the third image data.

In this embodiment, the image processing apparatus may generate a difference image according to the first image data, the second image data, and the third image data included in the first to-be-processed image obtained in operation 201. Specifically, the difference image is a gray-scale image. A method for generating the difference image in this embodiment is similar to that in the embodiment corresponding to FIG. 2. Details are not described herein again.

Specifically, the difference image generated in this case may show the outline of the car.

203: Perform binarization processing on the difference image, to obtain a binarized image, a foreground region of the binarized image corresponding to a pathological tissue region of the to-be-processed medical image.

In this embodiment, the image processing apparatus may perform binarization processing on the difference image generated in operation 202 to obtain the binarized image. Specifically, in this embodiment, foreground processing is performed in an adaptive binarization manner, that is, binarization processing is performed on the difference image, thereby obtaining the binarized image. A method for generating the binarized image in this embodiment is similar to that in the embodiment corresponding to FIG. 2. Details are not described herein again.

Specifically, the binarization image generated in this case can accurately show the outline of the car.

204: Extract a target object from the first to-be-processed image according to the foreground region of the binarized image.

In this embodiment, the image processing apparatus may extract the target object from the first to-be-processed image according to the foreground region generated in operation 203. If the first to-be-processed image is a medical image, the target object may be a pathological tissue region. If the first to-be-processed image is a high-resolution remote sensing image, the target object may be a vegetation region. If the first to-be-processed image is a real-time traffic monitoring image, the target object may be a bicycle or a car.

Specifically, in this case, the image of the car may be removed from the first to-be-processed image, that is, the image of the car is the target object.

205: Generate a synthesized image according to the target object and the second to-be-processed image, the target object being on a first image layer, the second to-be-processed image being on a second image layer, and the first image layer covering the second image layer.

In this embodiment, the image processing apparatus sets the target object as the first image layer and sets the second to-be-processed image as the second image layer, and the first image layer covers the second image layer, to generate a synthesized image.

Specifically, the image of the car covers the image of the blue sky and white cloud to form a synthesized image. It can be seen on the image that the background of the car is no longer a cloudy day, and instead is the blue sky and white cloud.

In this embodiment of the disclosure, an image processing method is provided. In the foregoing manner, color information of a gray-scale pixel in different channels is slightly different, and color information of a color pixel in different channels is greatly different. Therefore, a difference image is generated based on color information of different channels before binarization processing is performed on an image, thereby effectively using the color information in the image. The target object extracted based on the difference image is more accurate. Thus, the layer of the target object covers the layer of the second to-be-processed image, and the generated synthesized image summarizes the target object accurately, thereby improving accuracy of the synthesized image and facilitating subsequent image analysis.

Figure 12:
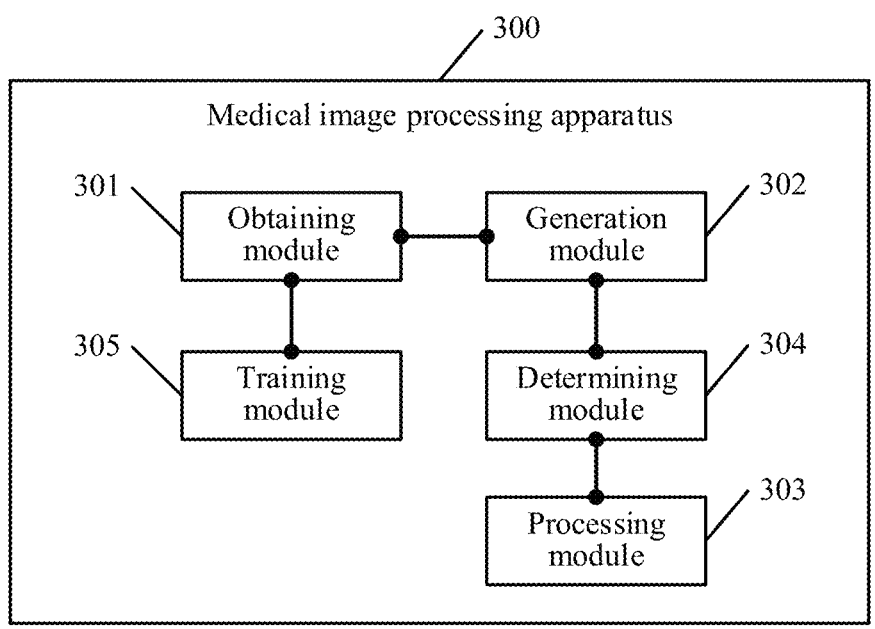
FIG. 12 is a schematic diagram of a medical image processing apparatus according to an embodiment of the disclosure.

A medical image processing apparatus in the disclosure is described below in detail. FIG. 12 is a schematic diagram of a medical image processing apparatus according to an embodiment of the disclosure. The medical image processing apparatus 300 includes:

an obtaining module 301, configured to obtain a to-be-processed medical image, the to-be-processed medical image being a color image, the to-be-processed medical image including first image data, second image data, and third image data, and the first image data, the second image data, and the third image data respectively corresponding to color information of different channels;

a generation module 302, configured to generate a difference image according to the first image data, the second image data, and the third image data; and a processing module 303, configured to perform binarization processing on the difference image, to obtain a binarized image, a foreground region of the binarized image corresponding to a pathological tissue region of the to-be-processed medical image.

In this embodiment of the disclosure, a medical image processing method is provided. In the foregoing manner, color information of a gray-scale pixel in different channels is slightly different, and color information of a color pixel in different channels is greatly different. Therefore, a difference image is generated based on color information of different channels before binarization processing is performed on an image, thereby effectively using the color information in the image. The pathological tissue region extracted based on the difference image is more accurate and facilitates subsequent image analysis.

Based on the embodiment corresponding to FIG. 12, in another example embodiment of the medical image processing apparatus 300, the generation module 302 is further configured to generate the maximum value image and the minimum value image according to the first image data, the second image data, and the third image data included in the to-be-processed medical image; and generate the difference image according to the maximum value image and the minimum value image.

This embodiment of the disclosure provides a method for generating the difference image. In the foregoing manner, the maximum value image and the minimum value image are generated according to the first image data, the second image data, and the third image data. Because different image data corresponds to different color information and the maximum value image and the minimum value image are determined according to different image data, color information of the included to-be-processed medical image is highly accurate, and therefore the difference image is more accurately generated.

Based on the embodiment corresponding to FIG. 12, in another example embodiment of the medical image processing apparatus 300n, the generation module 302 is further configured to determine the maximum pixel value and the minimum pixel value according to a first pixel value of a first pixel location of the first image data, a second pixel value of a second pixel location of the second image data, and a third pixel value of a third pixel location of the third image data; and obtain a maximum value image according to the maximum pixel value, and obtain a minimum value image according to the minimum pixel value, where a pixel value of a fourth pixel location of the maximum value image is the maximum pixel value, a pixel value of a fifth pixel location of the minimum value image is the minimum pixel value, and the first pixel location, the second pixel location, the third pixel location, the fourth pixel location, and the fifth pixel location all correspond to the same pixel location of the to-be-processed medical image; and the generation module 302 is further configured to determine a pixel difference according to the pixel value of the fourth pixel location of the maximum value image and the pixel value of the fifth pixel location of the minimum value image; and obtain the difference image according to the pixel difference, where a pixel value of a sixth pixel location of the difference image is the pixel difference, and the fourth pixel location, the fifth pixel location, and the sixth pixel location all correspond to the same pixel location of the to-be-processed medical image.

This embodiment of the disclosure provides a method for generating a maximum value image. In the foregoing manner, a maximum pixel value and a minimum pixel value are determined based on pixel values of a target pixel corresponding to first image data, second image data, and third image data. The maximum pixel value and the minimum pixel value reflect color information of the to-be-processed medical image to some extent. The minimum pixel value is subtracted from the maximum pixel value to obtain a difference pixel value. Therefore, the difference pixel value can accurately reflect color information of the to-be-processed medical image, and therefore the difference image is more accurately generated.

Based on the embodiment corresponding to FIG. 12, in another example embodiment of the medical image processing apparatus 300, the generation module 302 is further configured to generate a to-be-processed difference image according to the first image data, the second image data, and the third image data; and perform Gaussian blur processing on the to-be-processed difference image, to obtain the difference image.

This embodiment of the disclosure provides another method for generating the difference image. In the foregoing manner, Gaussian blur processing is performed on the generated to-be-processed difference image. Because Gaussian blur processing can improve robustness, the obtained difference image has better robustness, thereby improving stability of the difference image.

Based on the embodiment corresponding to FIG. 12, in another example embodiment of the medical image processing apparatus 300, the medical image processing apparatus 300 further includes a determining module 304, where the determining module 304 is configured to determine a binarization threshold according to the difference image; and the determining module 304 is further configured to perform binarization processing on the difference image according to the binarization threshold, to obtain the binarized image.

This embodiment of the disclosure provides a method for obtaining the binarized image. In the foregoing manner, the binarized image is generated according to binarization processing. Because a geometric property of the binarized image is not related to a gray-scale value of a pixel, subsequent processing of the binarized image may become simple, thereby improving foreground region generation efficiency.

Based on the embodiment corresponding to FIG. 12, in another example embodiment of the medical image processing apparatus 300, the determining module 304 is further configured to obtain, according to the difference image, N pixel values corresponding to N pixels, where the pixel value and the pixel are in a one-to-one correspondence, and N is an integer greater than 1;

determine a reference pixel value in the N pixel values, where the reference pixel value is a maximum value of the N pixel values; and determine the binarization threshold according to the reference pixel value and a preset proportion.

This embodiment of the disclosure provides another method for obtaining the binarization threshold. In the foregoing manner, the binarization threshold may be determined based on the reference pixel value determined as the maximum pixel value and the preset ratio. Gray-scale depths of difference images are different. Besides, brightness distribution of different regions may also be different. Therefore, the binarization threshold may be flexibly determined by adjusting the preset ratio, to improve threshold accuracy and flexibility, and the binarized image is more accurately generated.

Based on the embodiment corresponding to FIG. 12, in another example embodiment of the medical image processing apparatus 300 the generation module 302 is further configured to detect a background region in the binarized image based on a flood algorithm, where the background region includes a plurality of background pixels;

obtain background pixels in a foreground region in the binarized image according to the binarized image and the background region in the binarized image, where the foreground region includes a plurality of foreground pixels;

change the background pixels in the foreground region in the binarized image to foreground pixels, to obtain a hole filling image; and perform median filtering processing on the hole filling image, to obtain a result image, where a foreground region of the result image corresponds to the pathological tissue region of the to-be-processed medical image.

This embodiment of the disclosure provides a method for generating the result image. In the foregoing manner, the background pixels in the foreground region are changed to the foreground pixels, and the obtained hole filling image is highly reliable. Besides, through the median filtering processing, the result image corresponding to the to-be-processed medical image is clear and has a desirable visual effect without damaging feature information such as the outline and the edge of the image.

Based on the embodiment corresponding to FIG. 12, in another example embodiment of the medical image processing apparatus 300, the processing module 303 is further configured to perform median filtering processing on the hole filling image, to obtain a filtered image;

obtain a boundary line of a foreground region in the filtered image, where the boundary line includes M pixels, and M is an integer greater than 1; and extend each of the M pixels of the boundary line outwards by K pixels, to obtain the result image, where K is an integer greater than or equal to 1.

This embodiment of the disclosure provides another method for generating the result image. In the foregoing manner, through the median filtering processing, the filtered image is clear and has a desirable visual effect without damaging feature information such as the outline and the edge of the image. Then, morphological processing is performed on the filtered image based on the flood algorithm, to improve accuracy and integrity of the result image.

Based on the embodiment corresponding to FIG. 12, in another example embodiment of the medical image processing apparatus 300, the obtaining module 301 is further configured to obtain an original medical image;

extract a medical sub-image from the original medical image based on the sliding window;

determine, based on the medical sub-image comprising the pathological tissue region, the medical sub-image as the to-be-processed medical image; and determine, based on the medical sub-image not comprising the pathological tissue region, the medical sub-image as a background image and remove the background image.

This embodiment of the disclosure provides a method for obtaining the to-be-processed medical image. In the foregoing manner, it is detected whether the medical sub-image includes the pathological tissue region, to determine the to-be-processed medical image, and the result image corresponding to the to-be-processed medical image that includes the pathological tissue region may be obtained through the foregoing operations. The result image includes the pathological tissue region. This facilitates subsequent processing and analysis of the pathological tissue region in the result image. Then, the medical sub-image that does not include the pathological tissue region is determined as a background image and the background image is removed, to reduce resource occupation.

Based on the embodiment corresponding to FIG. 12, in another example embodiment of the medical image processing apparatus 300, the image processing apparatus 300 further includes a training module 305, where the generation module 302 is further configured to generate a target positive sample image according to the to-be-processed image and the foreground region of the to-be-processed image, where the target positive sample image is a positive sample image in a positive sample set, and each positive sample image includes the pathological tissue region;

the obtaining module 301 is further configured to obtain a negative sample set, where the negative sample set includes at least one negative sample image, and each negative sample image does not include the pathological tissue region; and the training module 305 is configured to train an image processing model based on the positive sample set and the negative sample set.

This embodiment of the disclosure provides a method for training the image processing model. In the foregoing manner, the image processing model is trained based on the positive sample image set that includes the pathological tissue region and the negative sample set that does not include the pathological tissue region. This improves accuracy and reliability of the image processing model, thereby improving image processing efficiency and accuracy.

Figure 13:
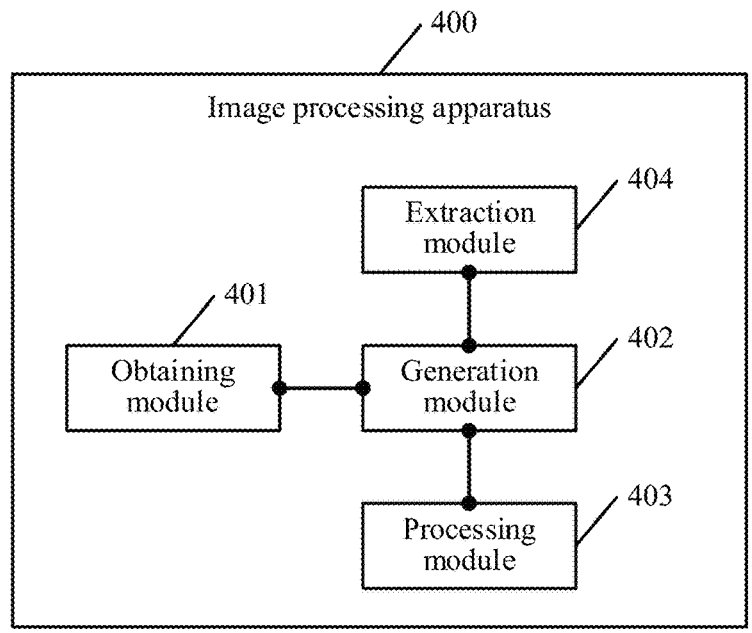
FIG. 13 is a schematic diagram of an image processing apparatus according to an embodiment of the disclosure.

An image processing apparatus in the disclosure is described below in detail. FIG. 13 is a schematic diagram of an embodiment of an image processing apparatus according to an embodiment of the disclosure. The image processing apparatus 400 includes:

an obtaining module 401, configured to obtain a first to-be-processed image and a second to-be-processed image, the first to-be-processed image being a color image, the first to-be-processed image including first image data, second image data, and third image data, and the first image data, the second image data, and the third image data respectively corresponding to color information of different channels;

a generation module 402, configured to generate a difference image according to the first image data, the second image data, and the third image data;

a processing module 403, configured to perform binarization processing on the difference image, to obtain a binarized image, a foreground region of the binarized image corresponding to a pathological tissue region of the to-be-processed medical image; and an extraction module 404, configured to extract a target object from the first to-be-processed image according to the foreground region of the binarized image; and the generation module 402 is further configured to generate a synthesized image according to the target object and the second to-be-processed image, the target object being on a first image layer, the second to-be-processed image being on a second image layer, and the first image layer covering the second image layer.

In this embodiment of the disclosure, an image processing method is provided. In the foregoing manner, color information of a gray-scale pixel in different channels is slightly different, and color information of a color pixel in different channels is greatly different. Therefore, a difference image is generated based on color information of different channels before binarization processing is performed on an image, thereby effectively using the color information in the image. The target object extracted based on the difference image is more accurate. Thus, the layer of the target object covers the layer of the second to-be-processed image, and the generated synthesized image summarizes the target object accurately, thereby improving accuracy of the synthesized image and facilitating subsequent image analysis.

Figure 14:
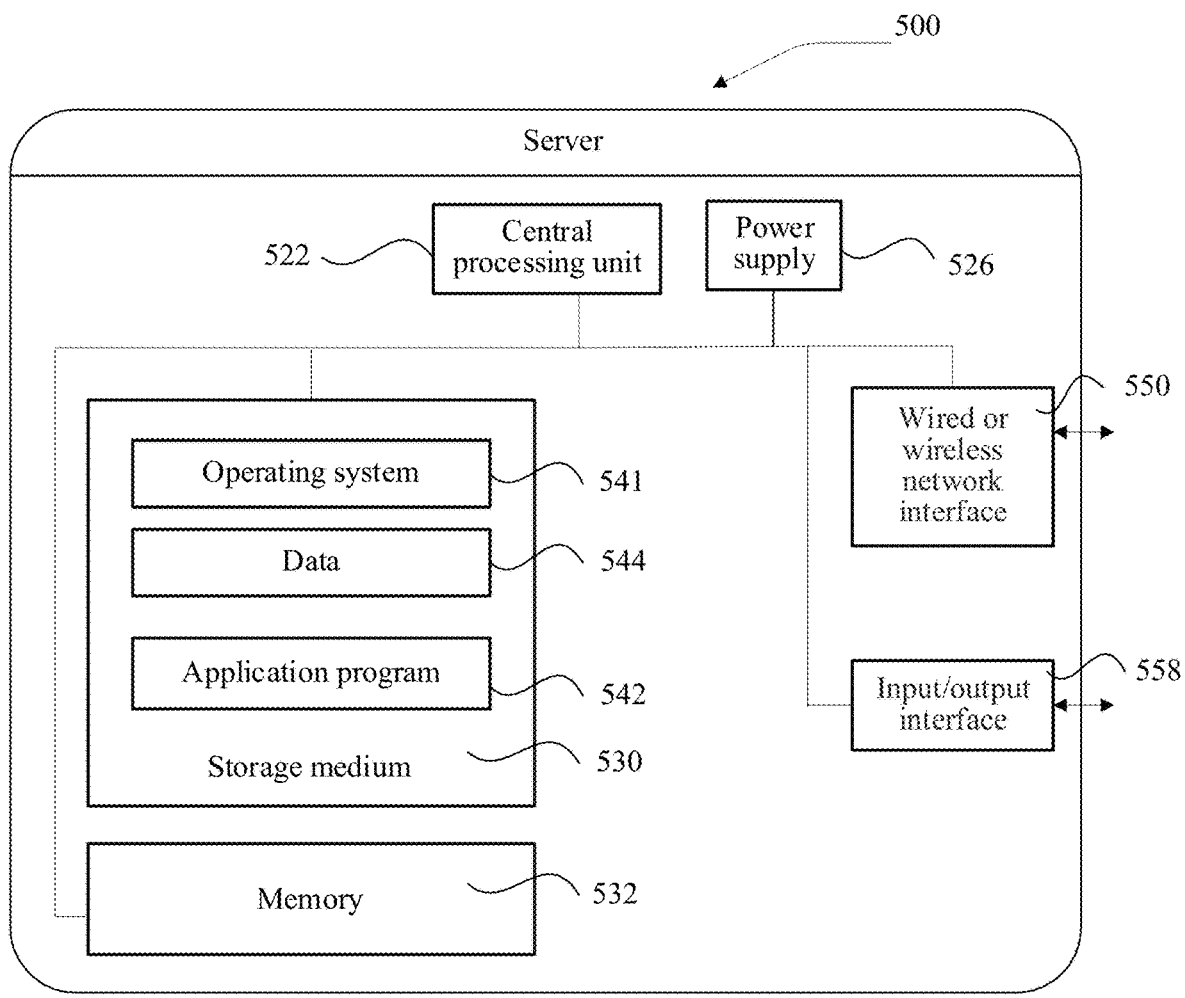
FIG. 14 is a schematic structural diagram of a server according to an embodiment of the disclosure.

FIG. 14 is a schematic structural diagram of a server according to an embodiment of the disclosure. The server 500 may vary greatly due to different configurations or performance, and may include one or more central processing units (CPU) 522 (for example, one or more processors) and a memory 532, and one or more storage media 530 (for example, one or more mass storage devices) that store applications 542 or data 544. The memory 532 and the storage medium 530 may be temporary storage or persistent storage. A program stored in the storage medium 530 may include one or more modules or code (which are not marked in the figure), and each module or code may include a series of instruction operations on the server. Further, the CPU 522 may be set to communicate with the storage medium 530, and perform, on the server 500, the series of instruction operations in the storage medium 530.

The server 500 may further include one or more power supplies 525, one or more wired or wireless network interfaces 550, one or more input/output interfaces 558, and/or one or more operating systems 541, for example, Windows Server™, Mac OS X™, Unix™, Linux™, or FreeBSD™.

The operations performed by the server in the foregoing embodiment may be based on the structure of the server shown in FIG. 14.

In this embodiment, the CPU 522 is configured to perform operations performed by the medical image processing apparatus in the embodiment corresponding to FIG. 2, and the CPU 522 is further configured to perform operations performed by the image processing apparatus in the embodiment corresponding to FIG. 1.

Persons skilled in the art can clearly understand that for convenience and conciseness of description, for specific working processes of the foregoing described system, apparatus and unit, reference may be made to the corresponding processes in the foregoing method embodiments, and details are not described herein.

In the several embodiments provided in the disclosure, the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units or code described as separate parts may or may not be physically separate, and parts displayed as units or code may or may not be physical units, may be located in one position, or may be distributed on a plurality of network units. Some or all of the units may be selected according to actual requirements to achieve the objectives of the solutions of the embodiments.

In addition, functional units in the embodiments of the disclosure may be integrated into one processing unit, or each of the units may be physically separated, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the operations of the methods described in the embodiments of the disclosure. The foregoing storage medium includes: any medium that can store program code, such as a USB flash drive, a removable hard disk, a read-only memory (read-only memory, ROM), a random access memory (random access memory, RAM), a magnetic disk or an optical disc.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A medical image processing method, executed by a server, comprising:
    obtaining a to-be-processed medical image, the to-be-processed medical image being a color image comprising first image data, second image data, and third image data that respectively correspond to color information of different channels;
    generating a difference image according to the first image data, the second image data, and the third image data;
    performing binarization processing on the difference image to obtain a binarized image, a foreground region of the binarized image corresponding to a pathological tissue region of the to-be-processed medical image;
    detecting a background region in the binarized image based on a flood algorithm, wherein the background region comprises a plurality of background pixels;
    obtaining background pixels in a foreground region in the binarized image according to the binarized image and the background region in the binarized image, wherein the foreground region comprises a plurality of foreground pixels;
    changing the background pixels in the foreground region in the binarized image to foreground pixels to obtain a hole filling image; and
    performing median filtering processing on the hole filling image to obtain a result image, wherein a foreground region of the result image corresponds to the pathological tissue region of the to-be-processed medical image.

2. The method according to claim 1, wherein the generating comprises:
    generating a maximum value image and a minimum value image according to the first image data, the second image data, and the third image data comprised in the to-be-processed medical image; and
    generating the difference image according to the maximum value image and the minimum value image.

3. The method according to claim 2, wherein the generating a maximum value image and a minimum value image according to the first image data, the second image data, and the third image data comprises:
    determining the maximum pixel value and the minimum pixel value according to a first pixel value of a first pixel location of the first image data, a second pixel value of a second pixel location of the second image data, and a third pixel value of a third pixel location of the third image data; and
    obtaining a maximum value image according to the maximum pixel value, and obtaining a minimum value image according to the minimum pixel value, wherein a pixel value of a fourth pixel location of the maximum value image is the maximum pixel value, a pixel value of a fifth pixel location of the minimum value image is the minimum pixel value, and the first pixel location, the second pixel location, the third pixel location, the fourth pixel location, and the fifth pixel location all correspond to the same pixel location of the to-be-processed medical image; and
    the generating the difference image according to the maximum value image and the minimum value image comprises:
    determining a pixel difference according to the pixel value of the fourth pixel location of the maximum value image and the pixel value of the fifth pixel location of the minimum value image; and
    obtaining the difference image according to the pixel difference, wherein a pixel value of a sixth pixel location of the difference image is the pixel difference, and the fourth pixel location, the fifth pixel location, and the sixth pixel location all correspond to the same pixel location of the to-be-processed medical image.

4. The method according to claim 1, wherein the generating comprises:
    generating a to-be-processed difference image according to the first image data, the second image data, and the third image data; and
    performing Gaussian blur processing on the to-be-processed difference image, to obtain the difference image.

5. The method according to claim 1, wherein the performing comprises:
    determining a binarization threshold according to the difference image; and
    performing binarization processing on the difference image according to the binarization threshold to obtain the binarized image.

6. The method according to claim 5, wherein the determining comprises:
    obtaining, according to the difference image, N pixel values corresponding to N pixels, wherein the pixel value and the pixel are in a one-to-one correspondence, and N is an integer greater than 1;
    determining a reference pixel value in the N pixel values, wherein the reference pixel value is a maximum value of the N pixel values; and
    determining the binarization threshold according to the reference pixel value and a preset proportion.

7. The method according to claim 1, wherein the performing median filtering processing on the hole filling image to obtain a result image comprises:
    performing median filtering processing on the hole filling image, to obtain a filtered image;
    obtaining a boundary line of a foreground region in the filtered image, wherein the boundary line comprises M pixels, and M is an integer greater than 1; and
    extending each of the M pixels of the boundary line outwards by K pixels, to obtain the result image, wherein K is an integer greater than or equal to 1.

8. The method according to claim 1, wherein the obtaining comprises:
    obtaining an original medical image;
    extracting a medical sub-image from the original medical image based on the sliding window;
    determining, based on the medical sub-image comprising the pathological tissue region, the medical sub-image as the to-be-processed medical image; and determining, based on the medical sub-image not comprising the pathological tissue region, the medical sub-image as a background image and removing the background image.

9. The method according to claim 1, wherein the method further comprises:
generating a target positive sample image according to the to-be-processed image and the foreground region of the to-be-processed image, wherein the target positive sample image is a positive sample image in a positive sample set, and each positive sample image comprises the pathological tissue region;
obtaining a negative sample set, wherein the negative sample set comprises at least one negative sample image, and each negative sample image does not comprise the pathological tissue region; and
training an image processing model based on the positive sample set and the negative sample set.

10. A medical image processing apparatus, comprising:
at least one memory configured to store computer program code;
at least one processor configured to operate as instructed by the computer program code, the computer program code including:
obtaining code configured to cause the at least one processor to obtain a to-be-processed medical image, the to-be-processed medical image being a color image comprising first image data, second image data, and third image data that respectively correspond to color information of different channels;
generation code configured to cause the at least one processor to generate a difference image according to the first image data, the second image data, and the third image data; and
processing code configured to cause the at least one processor to perform binarization processing on the difference image to obtain a binarized image, a foreground region of the binarized image corresponding to a pathological tissue region of the to-be-processed medical image,
wherein the computer code is further configured to cause the at least one processor to:
detect a background region in the binarized image based on a flood algorithm, wherein the background region comprises a plurality of background pixels;
obtain background pixels in a foreground region in the binarized image according to the binarized image and the background region in the binarized image, wherein the foreground region comprises a plurality of foreground pixels;
change the background pixels in the foreground region in the binarized image to foreground pixels to obtain a hole filling image; and
perform median filtering processing on the hole filling image to obtain a result image, wherein a foreground region of the result image corresponds to the pathological tissue region of the to-be-processed medical image.

11. The apparatus according to claim 10, wherein the generation code is further configured to cause the at least one processor to:
generate a maximum value image and a minimum value image according to the first image data, the second image data, and the third image data comprised in the to-be-processed medical image; and
generate the difference image according to the maximum value image and the minimum value image.

12. The apparatus according to claim 11, wherein the generate a maximum value image and a minimum value image according to the first image data, the second image data, and the third image data comprises:
determining the maximum pixel value and the minimum pixel value according to a first pixel value of a first pixel location of the first image data, a second pixel value of a second pixel location of the second image data, and a third pixel value of a third pixel location of the third image data; and
obtaining a maximum value image according to the maximum pixel value, and obtaining a minimum value image according to the minimum pixel value, wherein a pixel value of a fourth pixel location of the maximum value image is the maximum pixel value, a pixel value of a fifth pixel location of the minimum value image is the minimum pixel value, and the first pixel location, the second pixel location, the third pixel location, the fourth pixel location, and the fifth pixel location all correspond to the same pixel location of the to-be-processed medical image; and
the generate the difference image according to the maximum value image and the minimum value image comprises:
determining a pixel difference according to the pixel value of the fourth pixel location of the maximum value image and the pixel value of the fifth pixel location of the minimum value image; and
obtaining the difference image according to the pixel difference, wherein a pixel value of a sixth pixel location of the difference image is the pixel difference, and the fourth pixel location, the fifth pixel location, and the sixth pixel location all correspond to the same pixel location of the to-be-processed medical image.

13. The apparatus according to claim 10, wherein the generation code is further configured to cause the at least one processor to:
generate a to-be-processed difference image according to the first image data, the second image data, and the third image data; and
perform Gaussian blur processing on the to-be-processed difference image, to obtain the difference image.

14. The apparatus according to claim 10, wherein the processing code is further configured to cause the at least one processor to:
determine a binarization threshold according to the difference image; and
perform binarization processing on the difference image according to the binarization threshold to obtain the binarized image.

15. The apparatus according to claim 14, wherein the determine comprises:
obtaining, according to the difference image, N pixel values corresponding to N pixels, wherein the pixel value and the pixel are in a one-to-one correspondence, and N is an integer greater than 1;
determining a reference pixel value in the N pixel values, wherein the reference pixel value is a maximum value of the N pixel values; and
determining the binarization threshold according to the reference pixel value and a preset proportion.

16. The apparatus according to claim 10, wherein the perform median filtering processing on the hole filling image to obtain a result image comprises:
performing median filtering processing on the hole filling image, to obtain a filtered image;

obtaining a boundary line of a foreground region in the filtered image, wherein the boundary line comprises M pixels, and M is an integer greater than 1; and extending each of the M pixels of the boundary line outwards by K pixels, to obtain the result image, wherein K is an integer greater than or equal to 1.

17. The apparatus according to claim 10, wherein the obtaining code is further configured to cause the at least one processor to:

obtain an original medical image;

extract a medical sub-image from the original medical image based on the sliding window;

determine, based on the medical sub-image comprising the pathological tissue region, the medical sub-image as the to-be-processed medical image; and determine, based on the medical sub-image not comprising the pathological tissue region, the medical sub-image as a background image and removing the background image.

18. A non-transitory computer-readable storage medium, storing computer code that when executed by at least one processor causes the at least one processor to:

obtain a to-be-processed medical image, the to-be-processed medical image being a color image comprising first image data, second image data, and third image data that respectively correspond to color information of different channels;

generate a difference image according to the first image data, the second image data, and the third image data;

perform binarization processing on the difference image to obtain a binarized image, a foreground region of the binarized image corresponding to a pathological tissue region of the to-be-processed medical image;

detect a background region in the binarized image based on a flood algorithm, wherein the background region comprises a plurality of background pixels;

obtain background pixels in a foreground region in the binarized image according to the binarized image and the background region in the binarized image, wherein the foreground region comprises a plurality of foreground pixels;

change the background pixels in the foreground region in the binarized image to foreground pixels to obtain a hole filling image; and perform median filtering processing on the hole filling image to obtain a result image, wherein a foreground region of the result image corresponds to the pathological tissue region of the to-be-processed medical image.

* * * * *